(12) United States Patent
Kamakari et al.

(10) Patent No.: US 10,129,028 B2
(45) Date of Patent: *Nov. 13, 2018

(54) RELATIONAL ENCRYPTION FOR PASSWORD VERIFICATION

(71) Applicant: FUJITSU LIMITED, Kawasaki-shi, Kanagawa (JP)

(72) Inventors: Ryota Kamakari, Toshima (JP);
Takeshi Shimoyama, Shinagawa (JP);
Hiroshi Tsuda, Fujisawa (JP);
Yoshinori Yaginuma, Kokubunji (JP);
Avradip Mandal, San Jose, CA (US);
Arnab Roy, Santa Clara, CA (US);
Hart Montgomery, Redwood City, CA (US); Toshiyuki Ishiguro, Ota (JP);
Kouhei Shigeta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/040,959

(22) Filed: Feb. 10, 2016

(65) Prior Publication Data
US 2017/0019255 A1    Jan. 19, 2017

Related U.S. Application Data

(63) Continuation-in-part of application No. 14/798,429, filed on Jul. 13, 2015.

(51) Int. Cl.
*G06F 21/32* (2013.01)
*H04L 9/32* (2006.01)
*H04L 29/06* (2006.01)

(52) U.S. Cl.
CPC ........... *H04L 9/321* (2013.01); *G06F 21/32* (2013.01); *H04L 9/3231* (2013.01);
(Continued)

(58) Field of Classification Search
CPC ... H04L 9/321; H04L 63/083; H04L 63/0861; H04L 63/0421; G06F 21/32
See application file for complete search history.

(56) References Cited

U.S. PATENT DOCUMENTS 9,749,138 B2 * 8/2017 Mandal ................ H04L 9/3231
2010/0174911 A1    7/2010 Isshiki
(Continued)

OTHER PUBLICATIONS

Office Action dated Aug. 15, 2017 issued with respect to the corresponding U.S. Appl. No. 14/798,429.
(Continued)

*Primary Examiner* — David J Pearson
(74) *Attorney, Agent, or Firm* — Maschoff Brennan

(57) ABSTRACT

A method of equality verification using relational encryption including receiving a relational key that includes a first relational key component and a registration ciphertext that includes an encryption of a first plaintext data set. The method includes storing the registration ciphertext without decrypting the registration ciphertext. After the storing of the registration ciphertext, the method includes receiving an authentication request and communicating a safeguard data set that includes a random challenge in response to the authentication request. The method includes receiving an encrypted response that is generated based on the safeguard data set and a second plaintext data set. The method includes verifying a relationship between the encrypted response and the registration ciphertext using the relational key without decrypting the encrypted response and without decrypting the registration ciphertext. The relationship indicates that equality exists between the first and the second plaintext data sets.

14 Claims, 15 Drawing Sheets

(52) U.S. Cl.
CPC .......... *H04L 9/3242* (2013.01); *H04L 9/3271* (2013.01); *H04L 63/08* (2013.01); *H04L 63/0861* (2013.01)

(56) References Cited

U.S. PATENT DOCUMENTS

| | | | |
|---|---|---|---|
| 2011/0113241 | A1 | 5/2011 | Umezawa et al. |
| 2011/0179289 | A1 | 7/2011 | Guenther |
| 2013/0174243 | A1 | 7/2013 | Inatomi et al. |
| 2013/0212645 | A1 | 8/2013 | Takahashi |
| 2014/0359290 | A1* | 12/2014 | McCusker ............... H04L 9/006 713/168 |
| 2015/0341174 | A1 | 11/2015 | Mandal et al. |
| 2016/0105402 | A1* | 4/2016 | Soon-Shiong ...... H04L 63/0428 713/164 |

OTHER PUBLICATIONS

Ran Canetti, Towards Realizing Random Oracles: Hash Functions That Hide All Partial Information. In Advances in CryptologyCRYPTO'97, pp. 455-469. Springer, 1997.
Shall Goldwasser et al., Multi-Input Functional Encryption, 40 pgs, 2013.
S. Dov Gordon et al., Multi-Input Functional Encryption, IACR Cryptology ePrint Archive, 2013:774, 52 pgs, 2013.
Dabbah, M. A., Dlay, S. S., & Woo, W. L (Apr. 2008). PCA Authentication of Facial Biometric in the Secure Randomized Mapping Domain. In Information and Communication Technologies: From Theory to Applications, 2008. CTTA2008. 3rd International Conference on (pp. 1-5). IEEE.
N. K. Ratha, J. H. Connell, and R. M. Bolle, "Enhancing security and privacy in biometrics-based authentication systems," IBM systems Journal, vol. 40, pp. 614-634, 2001.
R. Belguechi, E. Cherrier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security, vol. 39, Sec, 3.3.
A. Juels and M. Sudan, "A fuzzy vault scheme," IEEE International Symposium on Information Theory, pp. 408, 2002.
Ari Juels and Martin Wattenberg. A fuzzy commitment scheme. In ACM CCS 99, pp. 28-36. ACM Press, Nov. 1999.
Ari Juels and Madhu Sudan. A fuzzy vault scheme. Cryptology ePrint Archive, Report 2002/093, 2002. http://eprint.acr.org/20021093.
R. Belguechi, C. Rosenberger, and S. Aoudia, "Biohashing for securing fingerprint minutiae templates," in Proceedings of the 20th International Conference on Pattern Recognition, Washington. DC, USA, 2010, pp. 1168-1171.
Yevgeniy Dodis, Leonid Reyzin, and Adam Smith. Fuzzy Extractors: How to generate strong keys from biometrics and other noisy data. in Christian Cachin and Jan Camenisch, editors, EUROCRYPT 2004, vol. 3027 of LNCS, pp. 523-540. Springer, May 2004.
Yevgeniy Dodis and Adam Smith. Correcting errors without leaking partial information. In Harold N. Gabow and Ronald Fagin, editors. 37th ACM STOC, pp. 654-663. ACM Press May 2005.
P. Paillier, "Public-Key Cryptosystems Based on Composite Degree Residuosity Classes," Advances in Cryptology—EUROCRYPT '99 Lecture Notes in Computer Science vol. 1592, 1999, pp. 223-238. Apr. 15, 1999.
Yasuda, M., Shimoyama, T., Kogure, J., Yokoyama, K, Koshiba, T.: Practical packing method in somewhat homomorphic encryption. In: Data Privacy Management and Autonomous Spontaneous Security. Lecture Notes in Computer Science, pp. 34-50. Springer, Mar. 2014.
C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.
S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/2013/774.
Shafi Goldwasser, Vipul Goyal, Abhishek Jain, and Amit Sahai. Multi-input functional encryption. Cryptology ePrint Archive, Report 2013/727, 2013. http://eprintiacrorg/2013/727.
Ran Canetti. Towards realizing random oracles: Hash functions that hide all partial information. In Burton S. Kaliski Jr., editor, CRYPTO'97, vol. 1294 of LNCS, pp. 455-469. Springer, Aug. 1997.
Boaz Barak, Yevgeniy Dodis, Hugo Krawczyk, Olivier Pereira, Krzysztof Pietrzak, Francois-Xavier Standaert, and Yu Yu. Leftover hash lemma, revisited. In Phillip Rogaway, editor, CRYPTO 2011, vol. 6841 of LNCS, pp. 1-29. Springer, Aug. 2011.
Russell Impagliazzo, Leonid A. Levin, and Michael Luby. Pseudorandom generation from one-way functions (extended abstract). In 21st ACM STOC, pp. 12-24. ACM Press May 1989.
Office Action dated Jun. 3, 2016 issued with respect to the related U.S. Appl. No. 14/797,025.

* cited by examiner

FIG. 12

| | | | Verification Key | | |
|---|---|---|---|---|---|
| | | | Ux | Uy | Uz |
| | | | Kx | Ky | Kz |
| Verification Key | Ua | Ka | Ka-x | Ka-y | Ka-z |
| | Ub | Kb | Kb-x | Kb-y | X |
| | Uc | Kc | Kc-x | Kc-y | Kc-z |

1400

RELATIONAL ENCRYPTION FOR PASSWORD VERIFICATION

CROSS-REFERENCE TO RELATED APPLICATIONS

This application is a Continuation-In-Part Application of U.S. patent application Ser. No. 14/798,429 filed on Jul. 13, 2015, the entire contents of which are incorporated herein by reference.

FIELD

The embodiments discussed herein are related to equality verification using relational encryption.

BACKGROUND

User verification often includes equality verification. Generally, equality verification includes a system receiving a first data set. Later the system receives a second data set. The system performs a comparison to determine whether or not the first data set and the second data set are equal.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one aspect of an embodiment, a method of equality verification using relational encryption may include receiving, from a trusted entity server, a relational key that includes a first relational key component; receiving, from a user computing system, a registration ciphertext that includes an encryption of a first plaintext data set; storing, in a non-transitory computer-readable storage medium, the registration ciphertext without decrypting the registration ciphertext; after the storing of the registration ciphertext, receiving, from the user computing system, an authentication request; in response to the authentication request, communicating a safeguard data set that includes a random challenge to the user computing system; receiving, from the user computing system, an encrypted response that is generated based at least partially on the safeguard data set and a second plaintext data set; verifying, by each of a plurality of authentication servers, a relationship between the encrypted response and the registration ciphertext using the relational key without decrypting the encrypted response and without decrypting the registration ciphertext, the relationship indicating that equality exists between the first plaintext data set and the second plaintext data set; and communicating to the user computing system from one of the plurality of authentication servers an authentication signal indicative of whether there is equality between the first and second plaintext data sets in a case in which a combination of a first verification key assigned to the user computing system and a second verification key assigned to the one of the plurality of authentication servers permits access to a result of the verifying, and not communicating the authenticating signal to the user computing system in a case in which the combination of the first and second verification keys denies access to the result of the verifying, regardless of whether the authentication signal indicates that there is equality between the first and second plaintext data sets.

According to another aspect of an embodiment, a method of equality verification using relational encryption includes receiving, from a trusted entity server, a relational key that may include a first relational key component. The method may include receiving, from a user computing system, a registration ciphertext that may include an encryption of a first plaintext data set. The method may include storing, in a non-transitory computer-readable storage media, the registration ciphertext without decrypting the registration ciphertext. After the storing of the registration ciphertext, the method may include receiving, from the user computing system, an authentication request. In response to the authentication request, the method may include communicating a safeguard data set that includes a random challenge to the user computing system. The method may include receiving, from the user computing system, an encrypted response that is generated based at least partially on the safeguard data set and a second plaintext data set. The method may include verifying, by the one or more processors, a relationship between the encrypted response and the registration ciphertext using the relational key. The verifying occurs without decrypting the encrypted response and without decrypting the registration ciphertext, the relationship may indicate that equality exists between the first plaintext data set and the second plaintext data set.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 12 illustrates an example of an access restricting table;

DESCRIPTION OF EMBODIMENTS

Preferred embodiments of the present invention will be described with reference to the accompanying drawings.

User verification often includes equality verification. Generally, equality verification includes a system receiving a first data set related to medical and biological information. Later the system receives a second data set related to medical and biological information. The system performs a comparison to determine whether or not the first data set and the second data set are equal. In some systems, the first data set and the second data set may be encrypted when communicated to the system. To perform the comparison, the system decrypts the first data set and the second data set. The decryption often involves a private key stored on the system or a device controlled by the system. Moreover, the decryption involves storage, at least temporarily, of plaintext versions of the first data set and/or the second data set.

Accordingly, systems that perform equality verification in this or a similar fashion expose the system and users of the system to multiple vulnerabilities. For instance, an adversary may hack the system and access decrypted versions of the first data set and/or the second data set. Additionally or alternatively, an adversary may access the private key and intercept communications of the first data set and/or the second data set. The adversary may accordingly have access to the plaintext versions of the first data set and/or the second data set. Furthermore, if the system becomes an adversary, the system has access to the plaintext versions of the first data set and/or the second data set.

Some example embodiments described in this disclosure relate to systems and methods of equality verification using relational encryption. In relational encryption, instead of a comparison of decrypted data sets, equality is based on a relationship between encrypted data sets. Thus, a system implementing equality verification using relational encryption may not access or ever "know" a plaintext version of an encrypted data set. Furthermore, in relational encryption, the relationships between the encrypted data sets are based on a relational key. The relational key does not allow a plaintext data set to be derived from a ciphertext version of plaintext data set. Instead, the relational key may only allow a determination of whether the relationship exists. The relationship between the encrypted data sets is indicative of equality of the plaintext versions of the encrypted data sets.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
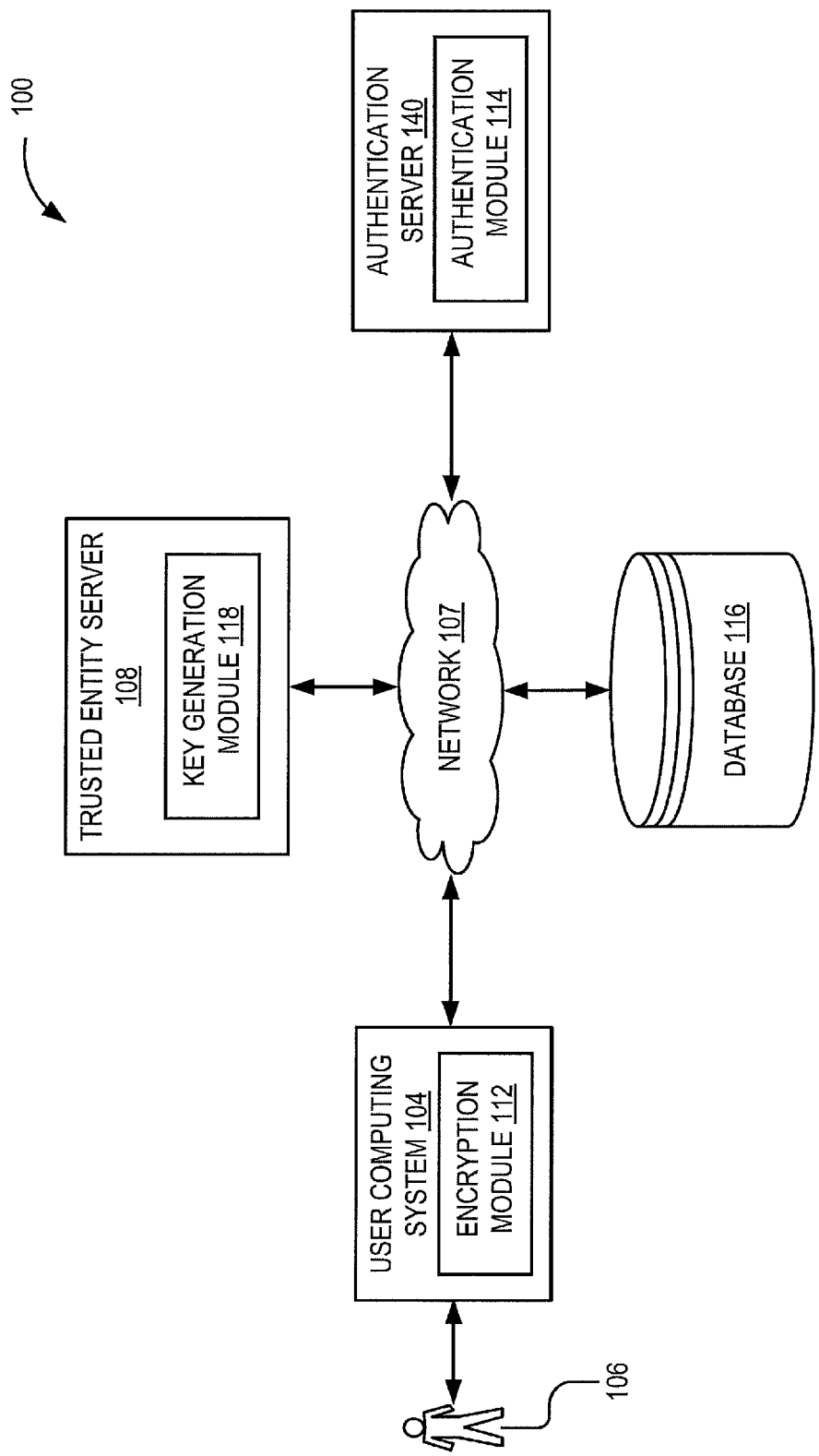
FIG. 1 is a block diagram of an example operating environment.

FIG. 1 illustrates a block diagram of an example operating environment 100, arranged in accordance with at least one embodiment described herein. In the operating environment 100, authentication of a user 106 may be performed by an authentication server 140. The authentication may include an equality verification between two plaintext data sets based on two corresponding ciphertext data sets that are communicated to the authentication server 140 at different times. The authentication may be performed using relational encryption.

Generally, relational encryption enables the authentication server 140 to ascertain relationships between ciphertext data sets that are indicative of equality between the plaintext data sets, without decrypting the ciphertext data sets. Moreover, relational encryption enables the authentication without storage of plaintext versions of the ciphertext data sets, without granting the authentication server 140 access to the plaintext versions, and without providing to the authentication server 140 one or more keys used to encrypt the plaintext data sets.

For example, the user 106 may communicate a registration ciphertext to the authentication server 140. The registration ciphertext may be representative of a first plaintext data set. An example of the first plaintext data set may include a password or another user-identifying data set. The registration ciphertext may be stored in a database 116 without decrypting or otherwise ascertaining the first plaintext data set represented by the registration ciphertext.

After the registration ciphertext is stored in the database 116, the user 106 may communicate an encrypted response to the authentication server 140. The encrypted response may be representative of a second plaintext data set. Using a relational encryption protocol, the authentication server 140 may determine whether one or more relationships exist between the encrypted response and the registration ciphertext. The relationship may be indicative of equality between the first plaintext data set and the second plaintext data set. The determination may be performed without decryption of the encrypted response or the registration ciphertext. Moreover, the relationship may be determined using a relational key that does not enable decryption of the encrypted response and/or the registration ciphertext. Some additional details of the relational encryption protocol are provided elsewhere in this disclosure.

The operating environment 100 includes a user computing system 104 that may be associated with the user 106, the database 116, a trusted entity server 108, the authentication server 140, and a network 107. The user computing system 104, the database 116, the trusted entity server 108, the authentication server 140 (collectively, "environment components") may be communicatively coupled via the network 107. The environment components may communicate data and information used to authenticate the user 106 or one or more data sets via the network 107. Each of the environment components are briefly described in the following paragraphs.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The trusted entity server 108 may include a processor-based computing system. For example, the trusted entity server 108 may include a hardware server or another processor-based computing system configured to function as a server. The trusted entity server 108 may include memory and network communication capabilities. In the operating environment 100, the trusted entity server 108 may be configured to communicate with the user computing system 104, the authentication server 140, and the database 116 via the network 107.

The trusted entity server 108 may be associated with a trusted entity. For example, the trusted entity may include a non-interested third party such as a certification authority. The user 106 and an entity associated with the authentication server 140 may trust, select, and agree upon the trusted entity.

The trusted entity server 108 may include a key generation module 118. The key generation module 118 may be configured to generate keys used in a relational encryption protocol. In some embodiments, the keys may include a public key set and a relational key. The keys generated by the key generation module 118 may be communicated to the user computing system 104 and the authentication server 140 or made available via the network 107.

The key generation module 118 may be implemented using hardware including a processor, a microprocessor (e.g., to perform or control performance of one or more operations), a field-programmable gate array (FPGA), or an application-specific integrated circuit (ASIC). In some other instances, the key generation module 118 may be implemented using a combination of hardware and software. Implementation in software may include rapid activation and deactivation of one or more transistors or transistor elements such as may be included in hardware of a computing system (e.g., the trusted entity server 108, the authentication server 140, and the user computing system 104). Additionally, software defined instructions may operate on information within transistor elements. Implementation of software instructions may at least temporarily reconfigure electronic pathways and transform computing hardware.

The database 116 may include any memory or data storage. The database 116 may include network communication capabilities such that the environment components may communicate with the database 116. In some embodiments, the database 116 may include computer-readable storage media for carrying or having computer-executable instructions or data structures stored thereon. The computer-readable storage media may include any available media that may be accessed by a general-purpose or special-purpose computer, such as a processor. For example, the database 116 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the database 116.

In the depicted embodiment, the database 116 is separate from the authentication server 140. In some embodiments, the database 116 may be included in the authentication server 140 or the authentication server 140 may include a local database similar to the database 116 and may access the database 116 via the network 107.

The user 106 may include an individual or another entity such as a corporate entity, an administrative entity, or the like. The user 106 may be associated with the user computing system 104 in some embodiments. For example, the user 106 may own or regularly operate the user computing system 104. In some embodiments, the user 106 may not be specifically associated with the user computing system 104. For example, the user computing system 104 may be publically accessible to multiple users including the user 106.

The user 106 may use the user computing system 104 to provide input to the encryption module 112. For example, the user 106 may operate a component of the user computing system 104 to provide input to the encryption module 112. The input may include one or more plaintext data sets that may be communicated or encrypted and communicated to the authentication module 114 of the authentication server 140.

The user computing system 104 may include a processor-based computing system. The user computing system 104 may include memory, a processor, and network communication capabilities. In the operating environment 100, the user computing system 104 may be capable of communicating data and information to the authentication server 140 via the network 107. Some examples of the user computing system 104 may include a mobile phone, a smartphone, a tablet computer, a laptop computer, a desktop computer, a set-top box, or a connected device (e.g., a smartwatch, smart glasses, a smart pedometer, or any other network-connectable device).

The user computing system 104 may include the encryption module 112. The encryption module 112 may be configured to encrypt plaintext data sets according to the relational encryption protocol using one or more keys. The encryption module 112 may be configured to receive the one or more keys from the trusted entity server 108, which one or more keys may be generated at the key generation module 118. Additionally, the encryption module 112 may be configured to access one or more keys that may be published.

The encryption module 112 may further receive input from the user 106 that includes plaintext data sets (e.g., a password). Using one or more of the keys, the encryption module 112 may encrypt the plaintext data sets and communicate the encrypted plaintext data sets to the authentication server 140. In some embodiments, the encrypted plaintext data sets may include a registration ciphertext and/or an encrypted response.

In addition, the encryption module 112 may be configured to receive a safeguard data set that may include a random challenge and/or an authentication signal communicated from the authentication server 140. The encryption module 112 may encrypt a plaintext data set using the safeguard data set and one or more of the keys. The authentication signal may reflect whether an authentication performed at the authentication server 140 is successful or unsuccessful. Based on the authentication signal, one or more processes or operations may be unlocked. For example, based on and/or in response to the authentication signal, the user 106 may access, modify, provide, etc. information and data to the user computing system 104 and/or another system (not shown).

The encryption module 112 may be implemented using hardware including a processor, a microprocessor (e.g., to perform or control performance of one or more operations), an FPGA, or an ASIC. In some other instances, the encryption module 112 may be implemented using a combination of hardware and software. Implementation in software may include rapid activation and deactivation of one or more transistors or transistor elements such as may be included in hardware of a computing system (e.g., the trusted entity server 108, the authentication server 140, and the user computing system 104). Additionally, software defined instructions may operate on information within transistor elements. Implementation of software instructions may at least temporarily reconfigure electronic pathways and transform computing hardware.

The authentication server 140 may include a processor-based computing device. For example, the authentication server 140 may include a hardware server or another processor-based computing device configured to function as a server. The authentication server 140 may include memory and network communication capabilities. In the operating environment 100, the authentication server 140 may be configured to communicate with the user computing system 104, the trusted entity server 108, and the database 116 via the network 107.

The authentication server 140 may include the authentication module 114. The authentication module 114 may be configured to verify equality using relational encryption. For example, the authentication module 114 may be configured to receive one or more keys from the trusted entity server 108. Additionally, the authentication module 114 may be configured to access one or more keys that may be published.

The authentication module 114 may receive a registration ciphertext from the user computing system 104 via the network 107. The authentication module 114 may store the registration ciphertext to the database 116. The authentication module 114 may not decrypt or have the capability to decrypt the registration ciphertext. In addition, the authentication module 114 may receive an authentication request, in response to which the authentication module 114 may communicate a safeguard data set that may include a random challenge. The authentication module 114 may then receive an encrypted response.

Using a relational encryption protocol, the authentication module 114 may verify equality between a first plaintext data set represented by the stored registration ciphertext and a second plaintext data set represented by the encrypted response. The equality between the first plaintext data set and the second plaintext data set may be based on a relationship between the stored registration ciphertext and the encrypted response. Based on whether equality exists between the first plaintext data set and the second plaintext data set, an authentication signal may be generated and communicated to the user computing system 104. For example, if equality exists, then the authentication signal may include an authentication message. If equality does not exist, then the authentication signal may include a fail message.

The authentication module 114 may be implemented using hardware including a processor, a microprocessor (e.g., to perform or control performance of one or more operations), an FPGA, or an ASIC. In some other instances, the authentication module 114 may be implemented using a combination of hardware and software. Implementation in software may include rapid activation and deactivation of one or more transistors or transistor elements such as may be included in hardware of a computing system (e.g., the trusted entity server 108, the authentication server 140, and the user computing system 104). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. Specifically, the operating environment may include one or more users 106, one or more user computing systems 104, one or more authentication servers 140, one or more trusted entity servers 108, one or more databases 116, or any combination thereof. For example, the operating environment 100 may include another system with which the user computing system 104 interacts based on the authentication signal.

Moreover, the separation of various components in the embodiments described herein is not meant to indicate that the separation occurs in all embodiments. It may be understood with the benefit of this disclosure that the described environment components may be integrated together in a single component or separated into multiple components. For example, in some embodiments, the encryption module 112 and/or one or more functionalities attributed thereto may be performed by a module on the authentication server 140.

In the operating environment 100, memory in one or more of the environment components may be similar to memory 308 described with reference to FIG. 3, processors in one or more of the environment components may be similar to a processor 304 described with reference to FIG. 3, and network communication capabilities of one or more of the environment components may be provided by a communication unit such as a communication unit 302 described with reference to FIG. 3.

Figure 2:
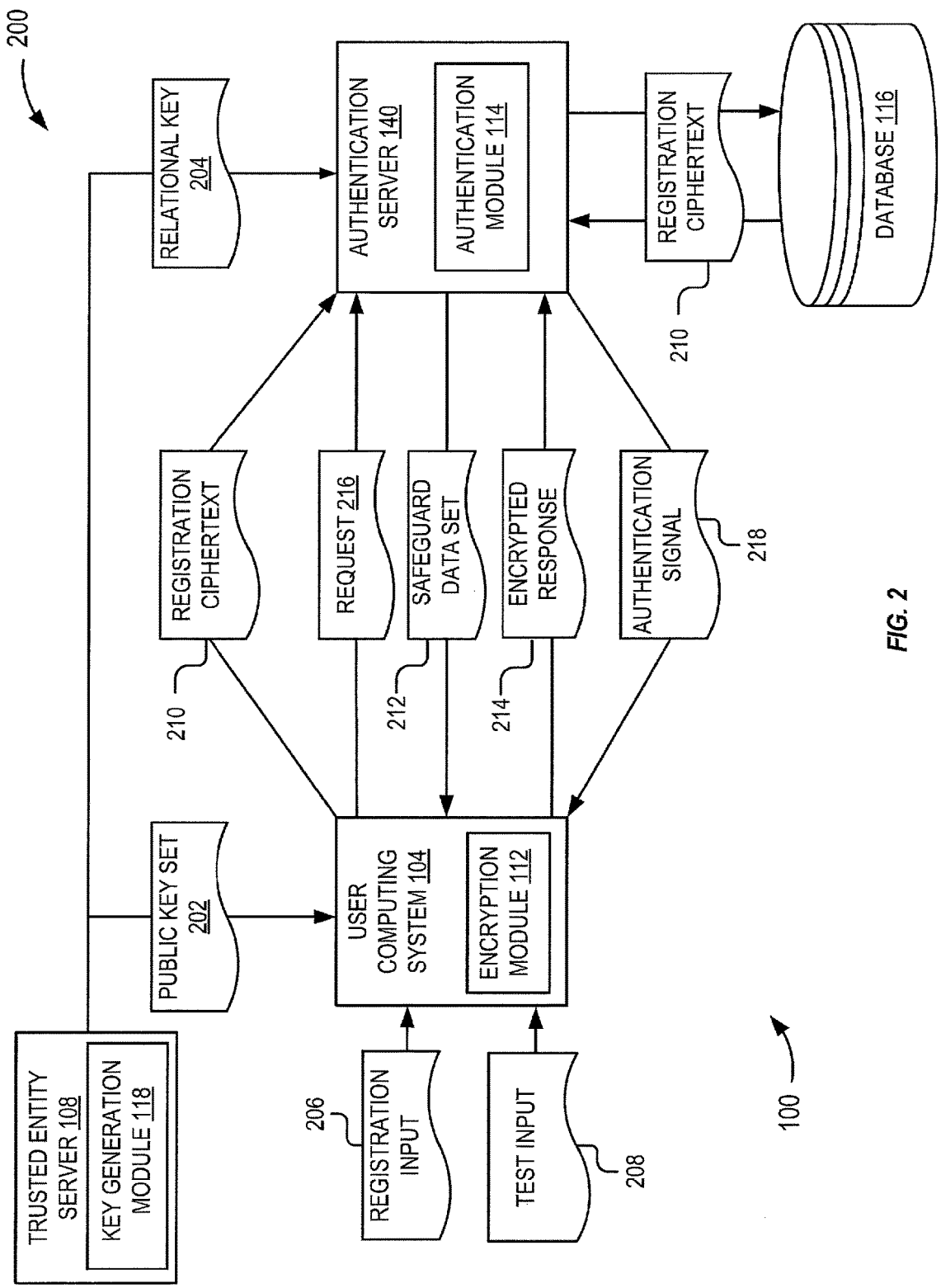
FIG. 2 illustrates an example equality verification process in the operating environment of FIG. 1.

FIG. 2 illustrates an example equality verification process 200 that may be implemented in the operating environment 100 of FIG. 1. In the operating environment 100 of FIG. 2, the network 107 is omitted. Nevertheless, communication of information and data (e.g., 202, 204, 210, 216, 212, 214, and 218) between the trusted entity server 108, the user computer system 104, the authentication server 140, and the database 116 may be via the network 107. In general, the equality verification process 200 may include communication of one or more key sets (202 and 204) to the user computing system 104 and the authentication server 140. The user computing system 104 may receive a registration input 206, encrypt it as a registration ciphertext 210, and communicate the registration ciphertext 210 to the authentication server 140. The authentication server 140 may store the registration ciphertext 210 in the database 116. Subsequently, the user computing system 104 may communicate an authentication request 216 (in FIG. 2, "request 216") to the authentication server 140. In response, the authentication server 140 may communicate a safeguard data set 212 that may include a random challenge to the user computing system 104. The user computing system 104 may receive the safeguard data set 212 and an authentication test input 208 (in FIG. 2, "test input 208"), encrypt the authentication test input 208 using the safeguard data set 212 as an encrypted response 214, and communicate the encrypted response 214 to the authentication server 140. The authentication server 140 may access the registration ciphertext 210. Using one or more of the keys, the authentication server 140 determines whether one or more relationships exist between the registration ciphertext 210 and the encrypted response 214. The relationships may indicate whether equality exists between the registration input 206 and the authentication test input 208 (e.g., if such relationships are present, then the equality exists) and thus may be used to verify equality between the registration input 206 and the authentication test input 208. The verification may be performed without decrypting the registration ciphertext 210 or the encrypted response 214. Based on whether equality exists between the registration input 206 and the authentication test input 208, the authentication server 140 may communicate an authentication signal 218 to the user computing system 104 or another system. Some additional details of the process 200 are provided in the following paragraphs.

The key generation module 118 of the trusted entity server 108 may be configured to generate keys used in a relational encryption protocol implemented in the equality verification process 200. In the depicted embodiment, the keys include a public key set 202 and a relational key 204. The relational key 204 may include a first relational key component and a secret hash key of a hash function. The public key set 202 may include a first public key, a second public key, a public hash key of the hash function, and the hash function.

To generate the keys, the key generation module 118 may generate bilinear groups. For example, given a particular security parameter, the bilinear groups may be generated of a prime order. The bilinear groups are exponential in the security parameter. The bilinear groups include a bilinear pairing operator. In some embodiments, the bilinear groups may be generated according to bilinear expression G1, G2, GT (x, q, e). In the bilinear expression, G1, G2, and GT represent bilinear groups. The parameter q represents the prime order. The parameter x represents the security parameter x. The parameter e represents the bilinear pairing operator. Some additional details of bilinear groups are discussed in U.S. patent application Ser. No. 14/287,051, which is incorporated herein by reference in its entirety.

The key generation module 118 may sample random sets from the bilinear groups. For example, one or more group elements may be randomly sampled from a first bilinear group of the bilinear groups and from a second bilinear group of the bilinear groups. In some embodiments, two group elements may be randomly sampled from the first bilinear group and three group elements may be randomly sampled from the second bilinear group. The two group elements of the first bilinear group may be related by a first group exponent. Additionally, two of the three group elements of the second bilinear group may be related by a second group exponent.

In some embodiments, the group elements may be randomly sampled according to bilinear group random sample expressions:

(g1, g2)←G1;
(h1, h2, A)←G2;
$g2 = g1^a$; and
$h2 = h1^b$.

In the bilinear group random sample expressions, G1 and G2 represent a first bilinear group and a second bilinear group, respectively. The parameter g1 represents a first element of the first bilinear group. The parameter g2 represents a second element of the first bilinear group. The parameter h1 represents a first element of the second bilinear group. The parameter h2 represents a second element of the second bilinear group. The parameter A represents a third element of the second bilinear group. The parameter a represents a first group exponent. The parameter b represents a second group exponent.

The key generation module 118 may define one or more hash keys. The hash keys may include a secret hash key of a hash function and a public hash key of the hash function. The secret hash key may include a projected hash key including four secret hash key elements. The secret hash key elements may be randomly sampled from a set of integers of an order of the prime order of the bilinear groups. In some embodiments, the secret hash key may be defined according to secret hash key expressions:

K=(k1, k2, k3, k4); and
(k1, k2, k3, k4)$\in Zq^4$

In the secret hash key expressions, q is as described above. The parameter K represents the secret hash key. The parameters k1, k2, k3, and k4 represent secret hash key elements of the secret hash key. The operator $\in$ is a membership operator. The symbol $Zq^4$ represents a set of integers of an order of the prime order of the bilinear groups. The 4 in the symbol $Zq^4$ indicates that four secret hash key elements k1, k2, k3, and k4 are sampled from the set of integers $Zq^4$.

The public hash key may include a first public hash key element and a second public hash key element. The first public hash key element may include a product of a first group element of the second bilinear group raised to a power of a first secret hash key element and a third group element of the second bilinear group raised to a power of a second secret hash key element.

The second public hash key element may include a product of the first group element of the second bilinear group raised to a power of a third secret hash key element and the third group element of the second bilinear group raised to a power of a fourth secret hash key element.

In some embodiments, the public hash key may be defined according to a public hash key expression:

$S = (d, E) = (h1^{k1} A^{k2}, h1^{k3} A^{k4})$

In the public hash key expression, h1, k1, A, k2, k3, and k4 are as described above. The parameter S represents the public hash key. The parameter d represents the first public hash key element. The parameter E represents the second public hash key element.

The key generation module 118 may define the relational key 204. The relational key 204 may include a first relational key component and the secret hash key. The first relational key component may include a product of the second group exponent and an inverse of the first group exponent. For example, in some embodiments, the relational key 204 may be defined according to relational key expressions:

$pkR = ba^{-1}$; and
rk:=(pkR, K).

In the relational key expressions, b, a, and K are as described above. The parameter pkR represents the first relational key component. The parameter rk represents the relational key.

The key generation module 118 may define the public key set 202. The public key set 202 may include a first public key, a second public key, the public hash key of the hash function, and the hash function. The first public key may include the first group element of the first bilinear group and the second group element of the first bilinear group. The second public key may include the first group element of the second bilinear group and the second group element of the second bilinear group. The hash function may include a collision resistant hash function.

In some embodiments, the public key set 202 may be defined according to public key set expressions:

pk1=(g1, g2);
pk2=(h1, h2);
pk:=(pk1, pk2, S, HASH); and
HASH: $\{0, 1\}^* \to Zq$.

In the public key set expressions, g1, g2, h1, h2, Zq, and S are as described above. The parameter pk1 represents the first public key. The parameter pk2 represents the second public key. The parameter pk represents the public key set. The operator:= represents a definitional operator. The function HASH represents the hash function. Some examples of the hash function may include a SHA3, MD5, or another suitable collision resistant cryptographic hash function. The $\{0, 1\}^*$ represents an input to the hash function.

In the depicted embodiment, the public key set 202 may be communicated to the user computing system 104 and the relational key 204 may be communicated to the authentication server 140. In some embodiments, one or both of the public key set 202 and the relational key 204 may be published to a public site, which may be accessed by the user computing system 104 and/or the authentication server 140.

The registration input 206 may be generated and communicated to the user computing system 104. With combined reference to FIGS. 1 and 2, the user 106 may generate the registration input 206, which may be input to the user computing system 104 via a user input device, for instance.

The registration input 206 may include a first plaintext data set. The registration input 206 may be a member of the set of integers of an order of the prime order of the bilinear groups. Additionally, the registration input 206 may come from a low entropy distribution. Some examples of the registration input 206 may include a password, a private tag, a social security number, a birth date, or a credit card number. Details of the particular registration input 206 may depend on a type of the operating environment 100.

For example, the operating environment 100 may include a consumer application, an enterprise data repository, an application hosted on a cloud, another suitable password-protected application, or some combination thereof. In these types of operating environments, the registration input 206 may include a password. Additionally or alternatively, the operating environment 100 may include index database records. In these operating environments, the registration input 206 may include private tags used for index records in the index database records.

The encryption module 112 may be configured to encrypt the registration input 206. In some embodiments, a pseudo random generator (PRG) may be applied to the registration input 206. The PRG may be applied prior to encryption by the encryption module 112 of the registration input 206. The encrypted registration input 206 or the encrypted registration input 206 with the PRG applied may be the registration ciphertext 210.

Encryption by the encryption module 112 may include sampling a random registration sample. The random registration sample may be sampled from the set of integers of the order of the prime order of the bilinear groups.

The registration ciphertext 210 that results from encryption of the registration input 206 may include a first registration element and a second registration element. The first registration element may include the first group element of the first bilinear group raised to a power of the random registration sample. The second registration element may include a second group element of the first bilinear group raised to a product of the random registration sample and the registration input 206 (a first plaintext data set). For example, the registration ciphertext 210 may be defined according to registration ciphertext expressions:

pwd∈Zq;
r←Zq; and
(I1, I2):=(g1$^r$, g2$^{r \cdot pwd}$).

In the registration ciphertext expressions, Zq, :=, ∈, g1, and g2, are as discussed above. The parameter pwd represents the registration input 206, which may include a first plaintext data set. The parameter r represents the random registration sample. The parameter I1 represents the first registration element. The parameter I2 represents the second registration element.

The user computing system 104 may communicate the registration ciphertext 210 to the authentication server 140, which may store the registration ciphertext 210 in the database 116, a non-transitory computer-readable storage media, some combination thereof, or another suitable storage device.

The authentication server 140 may communicate the safeguard data set 212 to the user computing system 104. The safeguard data set 212 may include a random challenge that is a member of the set of integers of an order of the prime order of the bilinear groups.

The encryption module 112 may compute the encrypted response 214. The encrypted response 214 may include an encrypted representation of the authentication test input 208. For example, the encrypted response 214 may be based at least partially on the safeguard data set 212, the public hash keys, a random test sample data set, and the authentication test input 208, which may include a second plaintext data set.

In some circumstances the authentication test input 208 may be substantially similar or substantially equal to the registration input 206. For example, in some embodiments, the user computing system 104 may be configured to allow access to some information pending verification of a user password. The user password may be initially input as registration input 206. If the same user later wants access to the information, the user may later input the authentication test input 208. Assuming the user has not forgotten their password, the registration input 206 and the authentication test input 208 may be the same. If, however, an imposter attempts to gain access to the information, the imposter may input an authentication test input 208, which may not be the same as the registration input 206. In this example, a function of the user computing system 104, the authentication server 140, the trusted entity server 108, or some combination thereof may be to determine whether it is an imposter or the user attempting to gain access to the information.

The encrypted response 214 may include a first response element, a second response element, a third response element, and a hash proof. One or more of the first response element, the second response element, the third response element, and the hash proof may be computed based on a random test sample that is sampled from the set of integers of the order of the prime order of the bilinear groups.

The first response element may include the first group element of the second bilinear group raised to a power of the random test sample. The second response element may include the second group element of the second bilinear group raised to a power of a product of the random test sample and the second plaintext data set. The third response element may include the third group element of the second bilinear group raised to a power of the random test sample. The hash proof may include a product of the first public hash key element and the second public hash key element raised to a power of a response function. This product may then be raised to a power of the random test sample. The response function may include the hash function applied to the first response element, the second response element, the third response element, and the safeguard data set 212.

For example, in some embodiments, the encrypted response 214 may be computed according to encrypted response expressions:

$(H1, H2, B) = (h1^s, h2^{s \cdot pwd'}, A^s)$;
$f = HASH (H1, H2, B, t)$;
$HP = (de^f)^s$;
$pwd' \in Zq$;
$s \leftarrow Zq$; and
$t \leftarrow Zq$ In the encrypted response expressions, h1, h2, A, d, e, ∈, and Zq are as described above. The parameter H1 represents the first response element. The parameter H2 represents the second response element. The parameter B represents the third response element. The value t represents the safeguard data set 212. The value s represents the random test sample. The parameter pwd' represents the authentication test input 208. The parameter HP represents the hash proof. The function f represents the response function.

The user computing system 104 or a component thereof may communicate the encrypted response 214 to the authentication server 140. The encrypted response may be received at the authentication server 140. The authentication server 140 may compute a hash of the encrypted response 214.

The authentication server 140 may verify the hash proof. In some embodiments, verifying the hash proof includes determining whether the hash proof satisfies proof verification expression. In some embodiments, the hash proof verification expression may include:

$HP \stackrel{?}{=} H1^{k1+fk2} A^{k2+fk4}$

In the hash proof verification expression, HP, H1, k1, f, k2, A, and k4 are as described above.

The authentication module 114 may verify whether equality exists between the registration input 206 and the authentication test input 208. Equality may exist between the registration input 206 and the authentication test input 208 when the registration input 206 and the authentication test input 208 are the same. The registration input 206 and the authentication test input 208 may be the same in circumstances in which a user (e.g., the user 106 of FIG. 1) generates the registration input 206 and the authentication test input 208. Equality may not exist between the registration input 206 and the authentication test input 208 when the registration input 206 and the authentication test input 208 are different. The difference between the registration input 206 and the authentication test input 208 may be indicative of an imposter inputting the authentication test input 208, for example.

Verification of the equality may be performed without decrypting the encrypted response 214 or the registration ciphertext 210. The verification may be based on a relationship between the encrypted response 214 and the registration ciphertext 210 as ascertained using the relational key 204. In some embodiments, verifying whether the equality exists includes determining whether an equality expression is satisfied. In some embodiments, the equality expression includes:

$e(I1, H2) \stackrel{?}{=} e(I2, H1)^{pkR}$

In the equality expression e, I1, H2, I2, H1 and pkR are as described above.

The authentication signal 218 may be indicative of whether there is equality between the registration input 206 and the authentication test input 208 and whether the hash proof is verified. For example, if there is equality between the registration input 206 and the authentication test input 208 and the hash proof is verified, then the authentication signal 218 may include an authentication message. If there is not equality between the registration input 206 and the authentication test input 208 or the hash proof is not verified, the authentication signal 218 may include a fail message.

Figure 3:
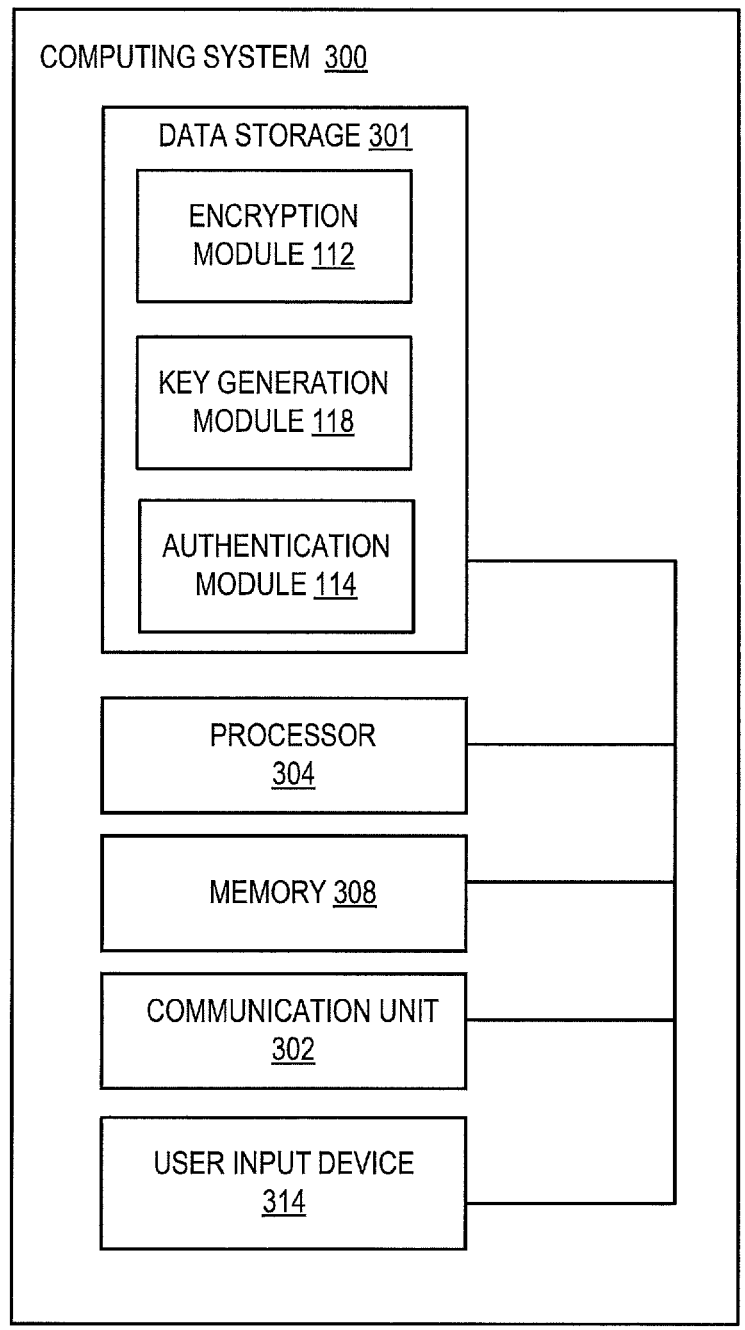
FIG. 3 illustrates an example computing system configured for equality verification using relational encryption.

FIG. 3 illustrates an example computing system 300 configured for equality verification using relational encryption. The computing system 300 may be implemented in the operating environment 100. Examples of the computing system 300 may include one or more of the user computing system 104, the authentication server 140, and the trusted entity server 108.

The computing system 300 may include one or more processors 304, a memory 308, a communication unit 302, a user input device 314, and a data storage 301 that further includes one or more of the authentication module 114, the key generation module 118, and the encryption module 112 (collectively, modules 112/114/118).

The processor 304 may include any suitable special-purpose or general-purpose computer, computing entity, or processing device including various computer hardware or software modules and may be configured to execute instructions stored on any applicable computer-readable storage media. For example, the processor 304 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 3, the processor 304 may more generally include any number of processors configured to perform individually or collectively any number of operations described in the present disclosure. Additionally, one or more of the processors 304 may be present on one or more different electronic devices or computing systems. In some embodiments, the processor 304 may interpret and/or execute program instructions and/or process data stored in the memory 308, the data storage 301, or the memory 308 and the data storage 301. In some embodiments, the processor 304 may fetch program instructions from the data storage 301 and load the program instructions in the memory 308. After the program instructions are loaded into the memory 308, the processor 304 may execute the program instructions.

The memory 308 and the data storage 301 may include computer-readable storage media for carrying or having computer-executable instructions or data structures stored thereon. Such computer-readable storage media may include any available media that may be accessed by a general-purpose or special-purpose computer, such as the processor 304. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 304 to perform a certain operation or group of operations.

The communication unit 302 may include one or more pieces of hardware configured to receive and send communications. In some embodiments, the communication unit 302 may include one or more of an antenna, a wired port, and modulation/demodulation hardware, among other communication hardware devices. In particular, the communication unit 302 may be configured to receive a communication from outside the computing system 300 and to present the communication to the processor 304 or to send a communication from the processor 304 to another device or network.

The user input device 314 may include one or more pieces of hardware configured to receive input from and/or provide output to a user. In some embodiments, the user input device 314 may include one or more of a speaker, a microphone, a display, a keyboard, and a touch screen, a holographic projection, among other hardware devices. In these and other embodiments, the user input device 314 may be configured to receive input from a user (e.g., the user 106 of FIG. 1) of the computing system 300.

The modules 112/114/118 may include program instructions stored in the data storage 301. The processor 304 may be configured to load the modules 112/114/118 into the memory 308 and execute the modules 112/114/118. Alternatively, the processor 304 may execute the modules 112/114/118 line-by-line from the data storage 301 without loading them into the memory 308. When executing the modules 112/114/118, the processor 304 may be configured for equality verification using relational encryption as described elsewhere herein.

Modifications, additions, or omissions may be made to the computing system 300 without departing from the scope of the present disclosure. For example, in some embodiments, the computing system 300 may not include the user input device 314. In some embodiments, the different components of the computing system 300 may be physically separate and may be communicatively coupled via any suitable mechanism. For example, the data storage 301 may be part of a storage device that is separate from a server, which includes the processor 304, the memory 308, and the communication unit 302, that is communicatively coupled to the storage device.

Figure 4:
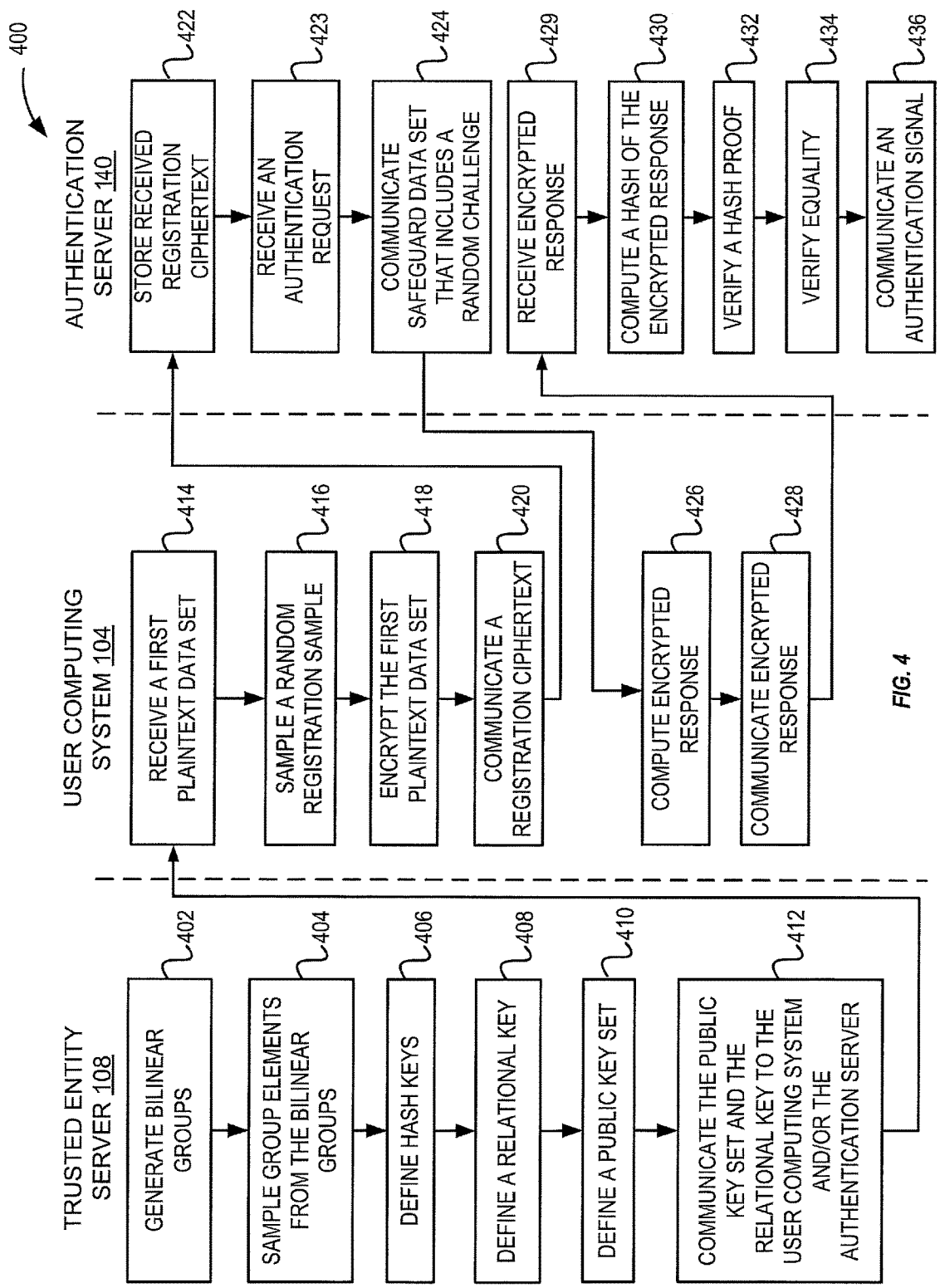
FIG. 4 is a flow diagram of a method of equality verification using relational encryption.

FIG. 4 is a flow diagram of an example method 400 of equality verification using relational encryption, arranged in accordance with at least one embodiment described herein. The method 400 may be performed in an operating environment such as the operating environment 100 of FIGS. 1 and 2. The method 400 may be programmably performed in some embodiments by some combination of the trusted entity server 108, the authentication server 140, and the user computing system 104 described with reference to FIGS. 1 and 2. The trusted entity server 108, the authentication server 140, and the user computing system 104 may include or may be communicatively coupled to a non-transitory computer-readable medium (e.g., the memory 308 or data storage 301 of FIG. 3) having stored thereon or encoded therein programming code or instructions that are executable by a processor to perform or cause performance of the method 400. Additionally or alternatively, the trusted entity server 108, the authentication server 140, and the user computing system 104 may include a processor (e.g., the processor 304 of FIG. 3) that is configured to execute computer instructions to perform or control performance of the method 400. Although illustrated as discrete blocks, various blocks may be divided into additional blocks, combined into fewer blocks, or eliminated, depending on the desired implementation.

Portions of the method 400 may be performed by one or more systems. For example, in the depicted flow chart, blocks 402, 404, 406, 408, 410, and 412 may be performed by a trusted entity server such as the trusted entity server 108 or a component thereof. Additionally, blocks 414, 416, 418, 420, 426, and 428 may be performed by a user computing systems such as the user computing system 104 or a component thereof and blocks 422, 423, 424, 429, 430, 432, 434, and 436 may be performed by an authentication server such as the authentication server 140 or a component thereof. In some embodiments one or more portions of the method 400 may be performed by another of the systems 108, 104, 140 or by one or more other systems.

The method 400 may begin at block 402 in which bilinear groups may be generated. In the depicted flow chart, the trusted entity server 108 may generate the bilinear groups. For example, given a particular security parameter, bilinear groups may be generated of a prime order. The bilinear groups may be exponential in the security parameter. The bilinear groups may include a bilinear pairing operator.

At block 404, one or more group elements may be sampled from one or more of the bilinear groups. For example, two group elements may be sampled from a first bilinear group of the bilinear groups and three group elements may be sampled from a second bilinear group of the bilinear groups. The two group elements sampled from the first bilinear group may be related by a first group exponent. Additionally, two of the three group elements sampled from the second bilinear group may be related by a second group exponent.

At block 406, one or more hash keys may be defined. The hash keys may include a secret hash key of a hash function and a public hash key of the hash function. The secret hash key may include a projected hash key including four secret hash key elements that are random samples of a set of integers of an order of the prime order of the bilinear groups. The public hash key may include a first public hash key element and a second public hash key element. For example, the public hash key may include the first public hash key element and the second hash key element discussed with reference to FIG. 2.

At block 408, a relational key may be defined. The relational key may include a first relational key component and the secret hash key. The first relational key component includes a product of the second group exponent and an inverse of the first group exponent.

At block 410, a public key set may be defined. The public key set may include a first public key, a second public key, the public hash key of the hash function, and the hash function. The first public key may include the group elements sampled from the first bilinear group. The second public key may include two of the three group elements of the second bilinear group. The hash function may include a collision resistant hash function.

At block 412, the public key set and the relational key may be communicated to the user computing system 104 and/or the authentication server 140. For example, the authentication server 140 may be given access to the relational key and the public key set. The public key set may be communicated to the user computing system 104.

At block 414, a first plaintext data set may be received. The first plaintext data set may be a member of the set of integers of an order of the prime order of the bilinear groups and/or may come from a low entropy distribution. The first plaintext data set may include a password such as a password implemented in a consumer application, enterprise data repository, an application hosted on a cloud, a combination thereof or another suitable password-protected application. The first plaintext data set may also include a private tag, which may be used to index database records or a social security number, a birthdate, a credit card number, or the like. In some embodiments, a pseudo random generator (PRG) may be applied to the first plaintext data set. The PRG may be applied prior to encryption of the first plaintext data set.

At block 416, a random registration sample may be sampled. The random registration sample may be sampled from the set of integers of the order of the prime order of the bilinear groups. At block 418, the first plaintext data set may be encrypted. The encryption of the first plaintext data set may be a registration ciphertext. The registration ciphertext includes a first registration element and a second registration element. The first registration element may be similar to the first registration element and the second registration element discussed with reference to FIG. 2.

At block 420, the registration ciphertext may be communicated. For example, the registration ciphertext may be communicated to the authentication server 140. At block 422, the registration ciphertext may be stored. For example, the authentication server 140 may store the registration ciphertext on a database such as the database 116 of FIGS. 1 and 2. The registration ciphertext may include the encryption of the first plaintext data set.

At block 423, an authentication request may be received. The authentication request may be received from the user computing system 104. At block 424, a safeguard data set that may include a random challenge may be communicated. For example, the safeguard data set may be communicated to the user computing system 104 in response to the authentication request being received. The random challenge may be a member of the set of integers of an order of the prime order of the bilinear groups.

At block 426, an encrypted response may be computed. The encrypted response may be computed that includes an encrypted representation of a second plaintext data set. For example, the encrypted response may include a first response element, a second response element, a third response element, and a hash proof. One or more of the first response element, the second response element, the third response element, and the hash proof may be computed as described with reference to FIG. 2. At block 428, the encrypted response may be communicated to the authentication server 140.

At block 429, the encrypted response may be received. Generally, the encrypted response may be received after the registration ciphertext is stored. At block 430, a hash of the received encrypted response may be computed. At block 432, the hash proof may be verified. In some embodiments, verifying the hash proof includes determining whether the hash proof satisfies a hash proof verification expression such as the hash proof verification expression discussed with reference to FIG. 2.

At block 434, equality may be verified. For example, it may be verified whether equality exists between the first plaintext data set and the second plaintext data set. Verification of the equality may be performed without decrypting the encrypted response or the registration ciphertext. The verification may be based on a relationship between the encrypted response and the registration ciphertext as ascertained using the relational key. In some embodiments, verifying whether the equality exists includes determining whether an equality expression is satisfied. For example, the equality expression may verify that the bilinear pairing operator applied to the first registration element and to the second response element is equal to the bilinear pairing operator applied to the second registration element and the first response element all taken to a power of the first relational key component.

At block 436, an authentication signal may be communicated to the user computing system 104. The authentication signal may be indicative of whether there is equality between the first and second plaintext data sets and/or whether the hash proof is verified. For example, if there is equality between the first and the second plaintext data sets and the hash proof is verified, then the authentication signal may include an authentication message. If there is not equality between the first and the second plaintext data sets or the hash proof is not verified, the authentication signal may include a fail message.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
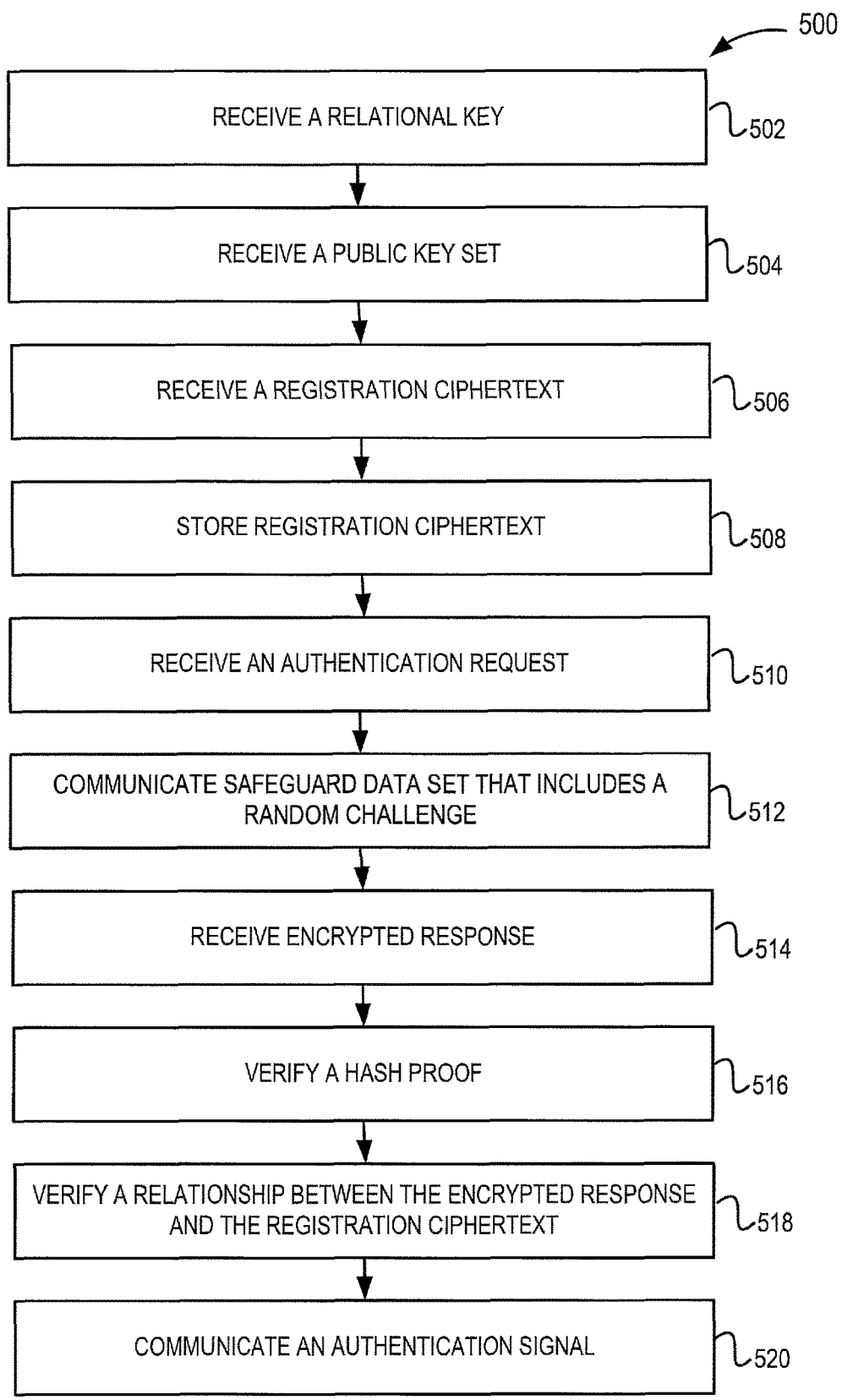
FIG. 5 is a flow diagram of another method of equality verification using relational encryption.

FIG. 5 is a flow diagram of an example method 500 of equality verification using relational encryption, arranged in accordance with at least one embodiment described herein. The method 500 may be performed in an operating environment such as the operating environment 100 of FIGS. 1 and 2. The method 500 may be programmably performed in some embodiments by the authentication server 140 described with reference to FIGS. 1 and 2. The authentication server 140 may include or may be communicatively coupled to a non-transitory computer-readable medium (e.g., the memory 308 of FIG. 3) having stored thereon or encoded therein programming code or instructions that are executable by a processor to perform or cause performance of the method 500. Additionally or alternatively, the authentication server 140 may include a processor (e.g., the processor 304 of FIG. 3) that is configured to execute computer instructions to perform or control performance of the method 500. Although illustrated as discrete blocks, various blocks may be divided into additional blocks, combined into fewer blocks, or eliminated, depending on the desired implementation.

The method 500 may begin at block 502 in which a relational key is received. The relational key may include a first relational key component and a secret hash key of a hash function. In some embodiments, the secret hash key includes a projected hash key including four secret hash key elements that may include random samples of a set of integers of an order of a prime order of bilinear groups. The bilinear groups may be generated based on a particular security parameter. The bilinear groups may be of a prime order. The bilinear groups may be exponential in the particular security parameter. The bilinear groups may include a bilinear pairing operator.

At block 504, a public key set may be received. The public key set may include a first public key, a second public key, a public hash key of the hash function, and the hash function.

The first public key includes two group elements randomly selected from a first bilinear group of the bilinear groups. The second public key includes two group elements of a second bilinear group of the bilinear groups. The two group elements of the first bilinear group are randomly sampled from the first bilinear group. The two group elements of the second bilinear group are randomly sampled from the second bilinear group.

In some embodiments, the two group elements of the first public key may be related by a first group exponent. The two group elements of the second public key may be related by a second group exponent. In these and other embodiments, the first relational key component includes a product of the second group exponent and an inverse of the first group exponent.

In some embodiments, the public hash key includes a first public hash key group element and a second public hash key group element. The first public hash key group element includes a product of a first group element of the two group elements of the second public key raised to a power of a first secret hash key element of the four secret hash key elements and a third group element of the second bilinear group raised to a power of a second secret hash key element of the four secret hash key elements.

The second public hash key group element includes a product of the first group element of the second bilinear group raised to a power of a third secret hash key element and the third group element of the second bilinear group raised to a power of a fourth secret hash key element.

At block 506, a registration ciphertext may be received, e.g., from a user computing system. The registration ciphertext may include an encryption of a first plaintext data set. The first plaintext data set may be representative of a password of a particular user, for instance. The registration ciphertext may include a first registration element and a second registration element. The first registration element may include the first group element of the first bilinear group raised to a power of a random registration sample. The second registration element may include a second group element of the first bilinear group raised to a product of the random registration sample and the first plaintext data set.

At block 508, the registration ciphertext may be stored. The registration ciphertext may be stored without decrypting the registration ciphertext. At block 510, an authentication request may be received, e.g., from a user computing system. In some embodiments, after the storing of the registration ciphertext, the authentication request may be received. At block 512, a safeguard data set that may include a random challenge may be communicated. For example, the safeguard data set may be communicated in response to the authentication request. The random challenge may be a member of a set of integers of an order of the prime order of the bilinear groups.

At block 514, an encrypted response may be received, e.g., from a user computing system. The encrypted response may be generated based at least partially on the safeguard data set and a second plaintext data set. The encrypted response may be further based on one or more public hash key elements of the public hash key and a random test sample data set. For example, the encrypted response may include a first response element, a second response element, a third response element, and a hash proof. The first response element may include the first group element of the second bilinear group raised to a power of a random encrypted response sample. The second response element may include the second group element of the second bilinear group raised to a power of a product of the encrypted response random sample and the second plaintext data set. The third response element may include the third group element of the second bilinear group raised to a power of the encrypted response random sample. The hash proof includes a value raised to a power of the encrypted response random sample. The value is a product of the first public hash key element and the second public hash key element raised to a power of a response function. The response function may include the hash function applied to the first response element, the second response element, the third response element, and the safeguard data set.

At block 516, the hash proof may be verified. In some embodiments, verifying the hash proof may include determining whether the hash proof satisfies a hash proof verification expression. An example of the hash proof verification expression is provided elsewhere in this disclosure.

At block 518, a relationship between the encrypted response and the registration ciphertext may be verified. The relationship may be verified using the relational key without decrypting the encrypted response and without decrypting the registration ciphertext. The relationship may indicate that equality exists between the first plaintext data set and the second plaintext data set. In some embodiments, the verifying the relationship includes determining whether an equality expression is satisfied. An example of the equality expression is provided elsewhere in this disclosure. At block 520, an authentication signal may be communicated. In some embodiments, the authentication signal is representative of whether equality exists between the first plaintext data set and the second plaintext data set.

As described above in conjunction with the embodiments, the equality verification verifies a relationship indicating an existence of an equality between an encrypted response, which is based at least partially on the safeguard data set and a second plaintext data set, from the user computing system, and a registration ciphertext, which includes an encryption of a first plaintext data set, using a relational key. The encrypted response and the registration ciphertext are not decrypted for this verifying.

According to the equality verification using the relational encryption described above, a user may perform a search to find out whether certain information is registered in a database. However, the certain information, which may be a search term (or word), a search statement, or the like is transferred in encrypted form and is not decrypted for the search and equality verification. In addition, the database also contains encrypted information which is not decrypted for the equality verification. As a result, the user can find out whether the certain information is registered in the database, without leaving a search (or browser) log containing the certain information itself in a Web server or the like, and the content of the search can be concealed from a third party. Further, although the user can find out whether the certain information is registered in the database, the certain information and the content related to the certain information, registered in the database in the encrypted form, can be concealed from the user.

In a case in which the user finds out that the certain information is registered in the database, the user may contact an owner or manager of the database, and make necessary arrangements (for example, by way of a contract) to acquire the content related to the certain information, registered in the database, when the owner or manager agrees to share the content with the user, for example.

In other words, even when the database is made accessible from the general public, for example, the content of the search can be concealed because the information to be searched is transferred in encrypted form and is not decrypted for the search and equality verification, to provide a searchable encryption. In addition, it is possible to find out, from the result of the equality verification using the relational encryption, whether the information being searched is registered in the database, however, the information and the content related to the information, registered in the database in the encrypted form, can be concealed because the database contains encrypted information which is not decrypted for the equality verification, to provide the searchable encryption.

Hence, in one application of the embodiments described above, one or more first entities may perform a search to find out, from results of the equality verification using the relational encryption, whether certain information being searched is registered in one or more databases of one or more second entities. The one or more first entities may acquire the content related to the certain information, registered in one or more databases, when the one or more second entities agree to share the content with the one or more first entities. As a result, useful information can be shared and utilized efficiently amongst the one or more first entities and the one or more second entities agreeing to the information sharing, while securing confidentiality of the content related to the certain information, registered in the database, from a third party. As will be described later, the third party may include one or more first entities not permitted by the one or more second entities to share the information.

In this case, the encryption may be performed using mutually different first (or search) keys amongst the first entities when performing the search. In addition, the encryption may be performed using mutually different second (or registration) keys amongst the second entities when registering the information in the respective databases, where the second keys are different from the first keys.

The first entities may perform the search to find out, from the results of the equality verification using the relational encryption, whether certain information being searched is registered in one or more databases of one or more second entities in a cloud computing environment which includes one or more processors, for big data analysis, for example.

The plaintext data set used in the embodiments described above may be related to various kinds of information, and is not limited to a certain kind of data set. Examples of the various kinds of information may include medical and biological information, technical information, financial information, or the like. The medical and biological information may include clinical data, health data, genome data, or the like. The technical information may include analysis data, evaluation data, experimental data, or the like in various technical fields. The financial information may include data related to banking, data related to securities, or the like.

The various kinds of information may be registered in a database in the form of registration ciphertext. As an example, the registration ciphertext including an encryption of the medical and biological information may be registered in the database of an entity such as a hospital, a research facility, a university, an administrative organization, a government institution, or the like.

Figure 6:
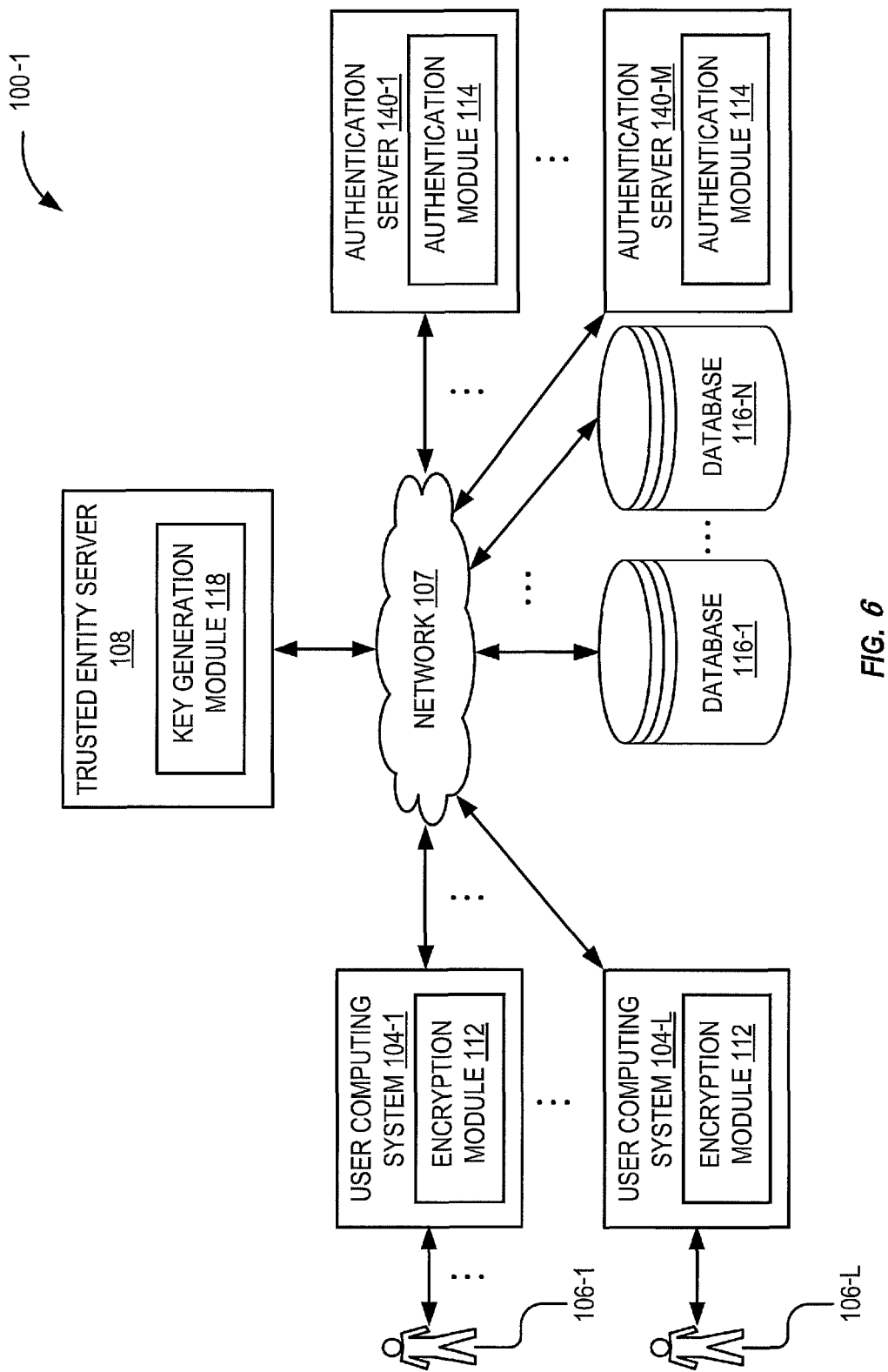
FIG. 6 is a block diagram of another example operating environment.

Next, a description will be given of an example of one application of the embodiments described above, by referring to FIG. 6. FIG. 6 is a block diagram of another example operating environment 100-1. In FIG. 6, those parts that are the same as those corresponding parts in FIG. 1 are designated by the same reference numerals, and a description thereof will be omitted. In FIG. 6, a plurality of user computing systems 104-1, . . . , and 104-L, a plurality of authentication servers 140-1, . . . , and 140-M, and a plurality of databases 116-1, . . . , and 116-N are provided, where L, M, and N are natural numbers greater than or equal to 2. L may be equal to or different from M, and M may be equal to or different from N. For example, two or more authentication servers may manage a common database. It is assumed for the sake of convenience that the user computing systems 104-1, . . . , and 104-L are used by users 106-1, . . . , and 106-L, respectively. The network 107 may include one or a plurality of networks, and the network 107 may include the Internet. At least one of the databases 116-1, . . . , and 116-N may be connected to a corresponding one of the authentication servers 140-1, . . . , and 140-M via a corresponding network, for example. The operating environment 100-1 may form a cloud computing environment.

The method of equality verification using the relational encryption in the operating environment 100-1 may be performed from each of the user computing systems 104-1, . . . , and 104L with respect to each of the databases 116-1, . . . , and 116-N of each of the authentication servers 140-1, . . . , and 140-M, in a manner described above in conjunction with FIGS. 1 through 5.

Figure 7:
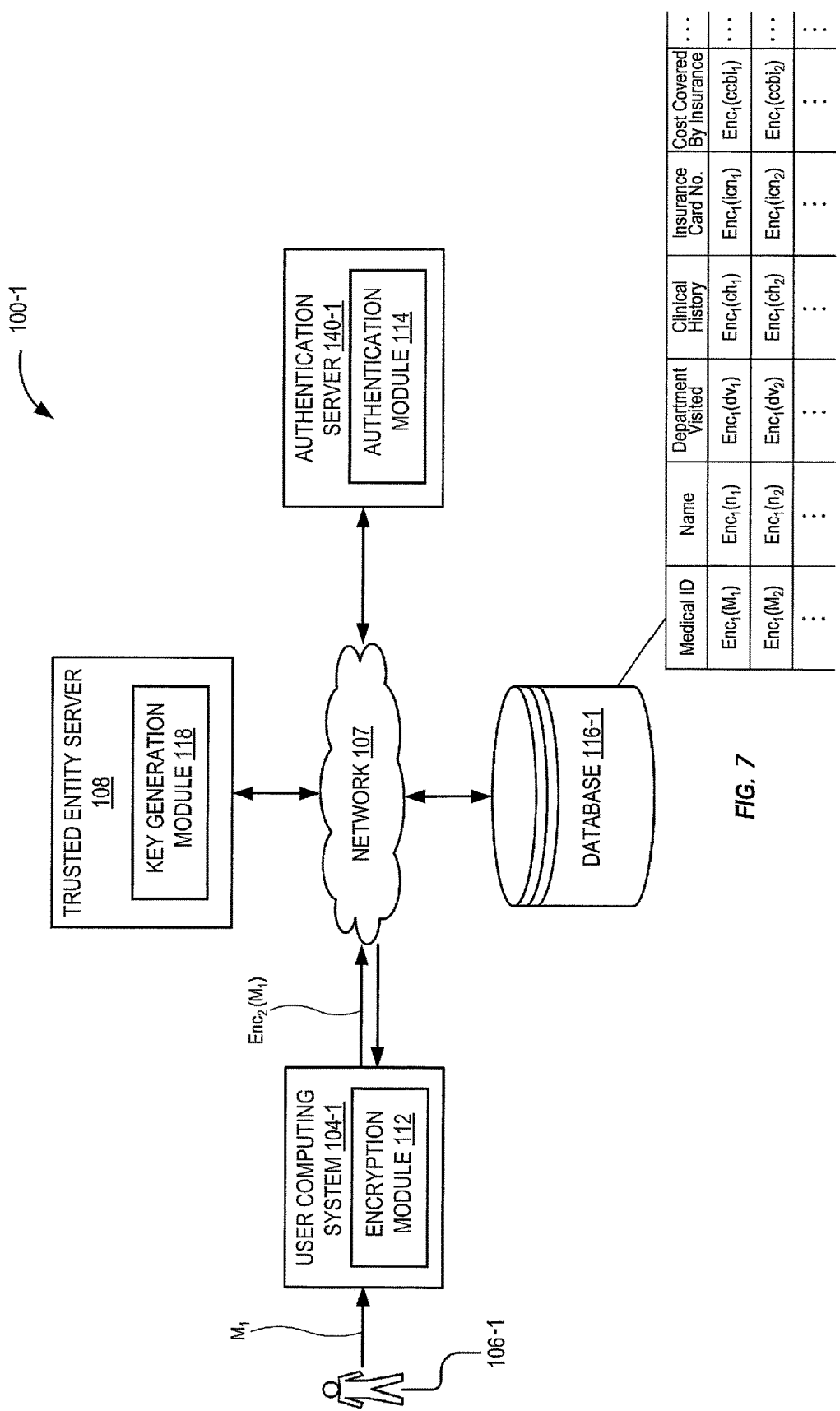
FIG. 7 is a diagram for explaining a first example of the method of equality verification using the relational encryption.

FIG. 7 is a diagram for explaining a first example of the method of equality verification using the relational encryption. In this first example, it is assumed for the sake of convenience that the user 106-1 operates the user computing system 104-1 to perform a search to find out, from results of the equality verification using the relational encryption, whether information being searched is registered in the databases 116-1, . . . , and 116-N of the authentication servers 140-1, . . . , and 140-M. It is also assumed that the information being searched is registered in the database 116-1 of the authentication server 140-1. It is further assumed that the information being searched and registered in the database 116-1 is clinical data, which is one example of medical and biometrical information.

In a case in which the information being searched is a medical ID assigned to an individual, for example, the user computing system 104-1 may be provided in an administrative organization, and the authentication server 140-1 and the database 116-1 may be provided in a hospital. As illustrated in FIG. 7, the database 116-1 may register clinical data such as a patient's name (n), a department visited (dv) by the patient, a clinical history (ch), an insurance card number (icn), a cost covered by the insurance (ccbi), or the like for each medical ID, in encrypted form. Hence, a medical ID $M_1$ is registered in encrypted form $Enc_1(M_1)$, and a medical ID $M_2$ is registered in encrypted form $Enc_1(M_2)$, for example. The authentication server 140-1 may be operated by a user (or operator) to register the clinical data in the database 116-1 in the encrypted form.

The user 106-1 of the user computing system 104-1 of the administrative organization may wish to know the hospital departments visited by the patient having the medical ID $M_1$, for example. In this case, the search for the medical ID $M_1$ is made in encrypted form $Enc_2(M_1)$, for example, and is not decrypted for the search and equality verification. The encryption $Enc_2$ used by the user computing system 104-1 for the search is different from the encryption $Enc_1$ used at the time of registering the clinical data in the encrypted form in the database 116-1. In addition, the clinical data in the encrypted form, registered in the database 116-1, is not decrypted for the equality verification. As a result, the user 106-1 of the user computing system 104-1 can find out whether the clinical data related to the medical ID $M_1$ is registered in the database, without leaving a search (or browser) log containing the medical ID $M_1$ itself in the Web server or the like, and the content of the search can be concealed from a third party. Further, although the user 106-1 can find out that the clinical data related to the medical ID $M_1$ is registered in the database 116-1, the content related to the medical ID $M_1$, registered in the database 116-1 in the encrypted form, can be concealed from the user 106-1.

In a case in which the user 106-1 finds out that the medical ID $M_1$ is registered in the database 116-1, the user 106-1 may contact an owner or manager of the database 116-1, that is, the hospital, and make necessary arrangements (for example, by way of a contract) to acquire at least a part of the content related to the medical ID $M_1$, registered in the database 116-1, when the owner or manager agrees to share the content with the user 106-1, for example. Accordingly, the owner of manager may agree to share, with the administrative organization, a part of the clinical data related to the medical ID $M_1$, that is, the hospital departments visited by the patient having the medical ID $M_1$. On the other hand, the owner of manager may not agree to share, with the administrative organization, another part of the clinical data related to the medical ID $M_1$, that is, the clinical history of the patient having the medical ID $M_1$, for example.

As a result, in this example, useful information can be shared and utilized efficiently between the administrative organization and the hospital agreeing to the information sharing with the administrative organization, while securing confidentiality of the clinical data related to the medical ID $M_1$, registered in the database, from a third party. It is also possible to secure confidentiality of a part of the clinical data related to the medical ID $M_1$, registered in the database, from the administrative organization to protect privacy information of the patient having the medical ID $M_1$.

Figure 8:
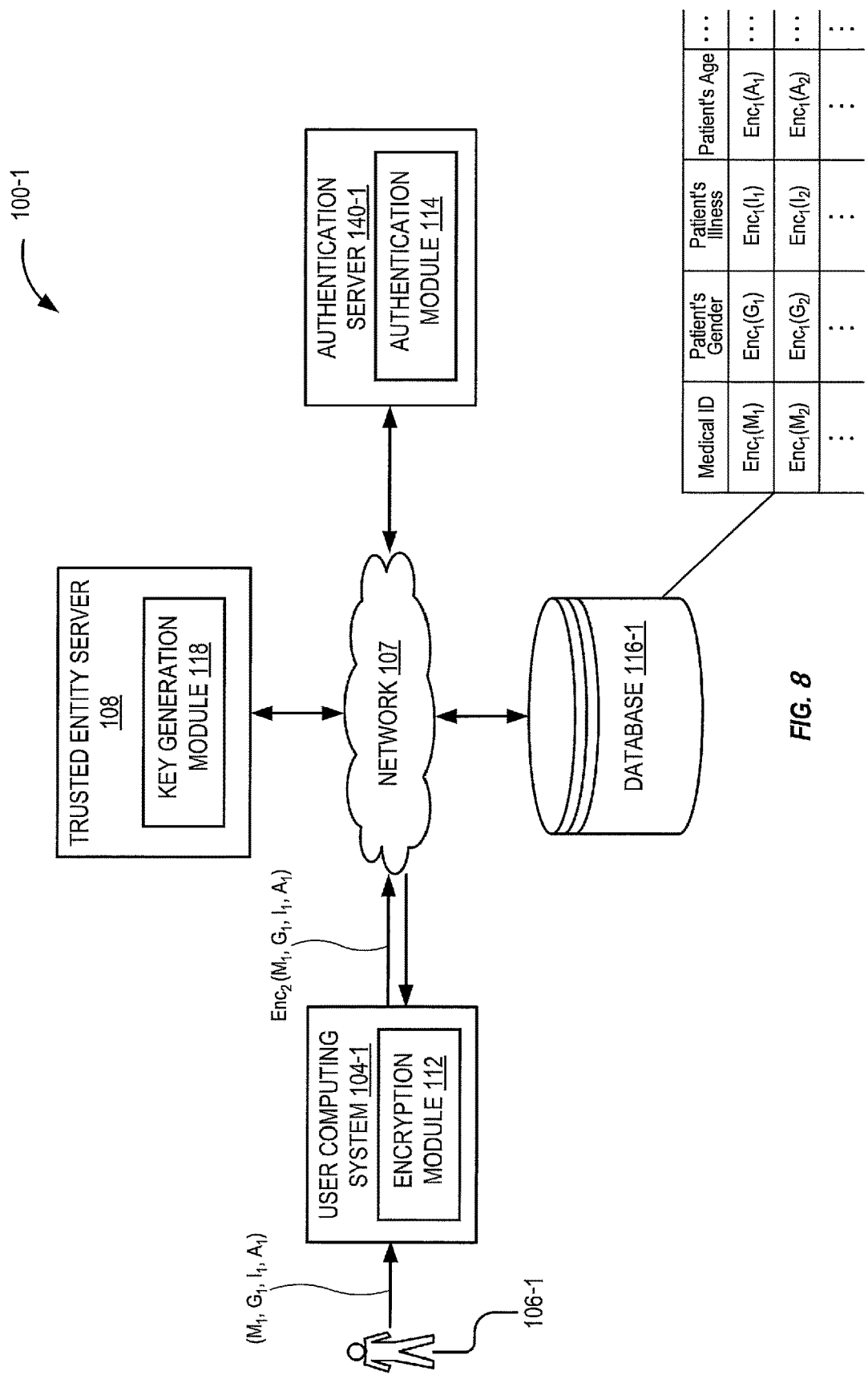
FIG. 8 is a diagram for explaining a second example of the method of equality verification using the relational encryption.

FIG. 8 is a diagram for explaining a second example of the method of equality verification using the relational encryption. In FIG. 8, those parts that are the same as those corresponding parts in FIG. 7 are designated by the same reference numerals, and a description thereof will be omitted.

As illustrated in FIG. 8, the database 116-1 may register clinical data such as a patient's gender, a patient's illness, a patient's age, or the like for each medical ID, in encrypted form. In this example, a combination of a plurality of clinical data of each medical ID corresponds to attribute data of the patient having the medical ID. The user 106-1 of the user computing system 104-1 of the administrative organization may wish to know whether a matching attribute data of the patient having the medical ID $M_1$ is registered in the database. In this case, the search for the matching attribute data $(M_1, G_1, I_1, A_1)$ is made in encrypted form $Enc_2(M_1, G_1, I_1, A_1)$, for example, and is not decrypted for the search and equality verification. The encryption $Enc_2$ used by the user computing system 104-1 for the search is different from the encryption $Enc_1$ used at the time of registering the clinical data in the encrypted form in the database 116-1. In addition, the attribute data in the encrypted form, registered in the database 116-1, is not decrypted for the equality verification. As a result, the user 106-1 of the user computing system 104-1 can find out whether the attribute data $(M_1, G_1, I_1, A_1)$ is registered in the database, without leaving a search (or browser) log containing the attribute data $(M_1, G_1, I_1, A_1)$ itself in the Web server or the like, and the content of the search can be concealed from a third party. Further, although the user 106-1 can find out that the attribute data $(M_1, G_1, I_1, A_1)$ is registered in the database 116-1, the attribute data $(M_1, G_1, I_1, A_1)$, registered in the database 116-1 in the encrypted form, can be concealed from the user 106-1.

Figure 9:
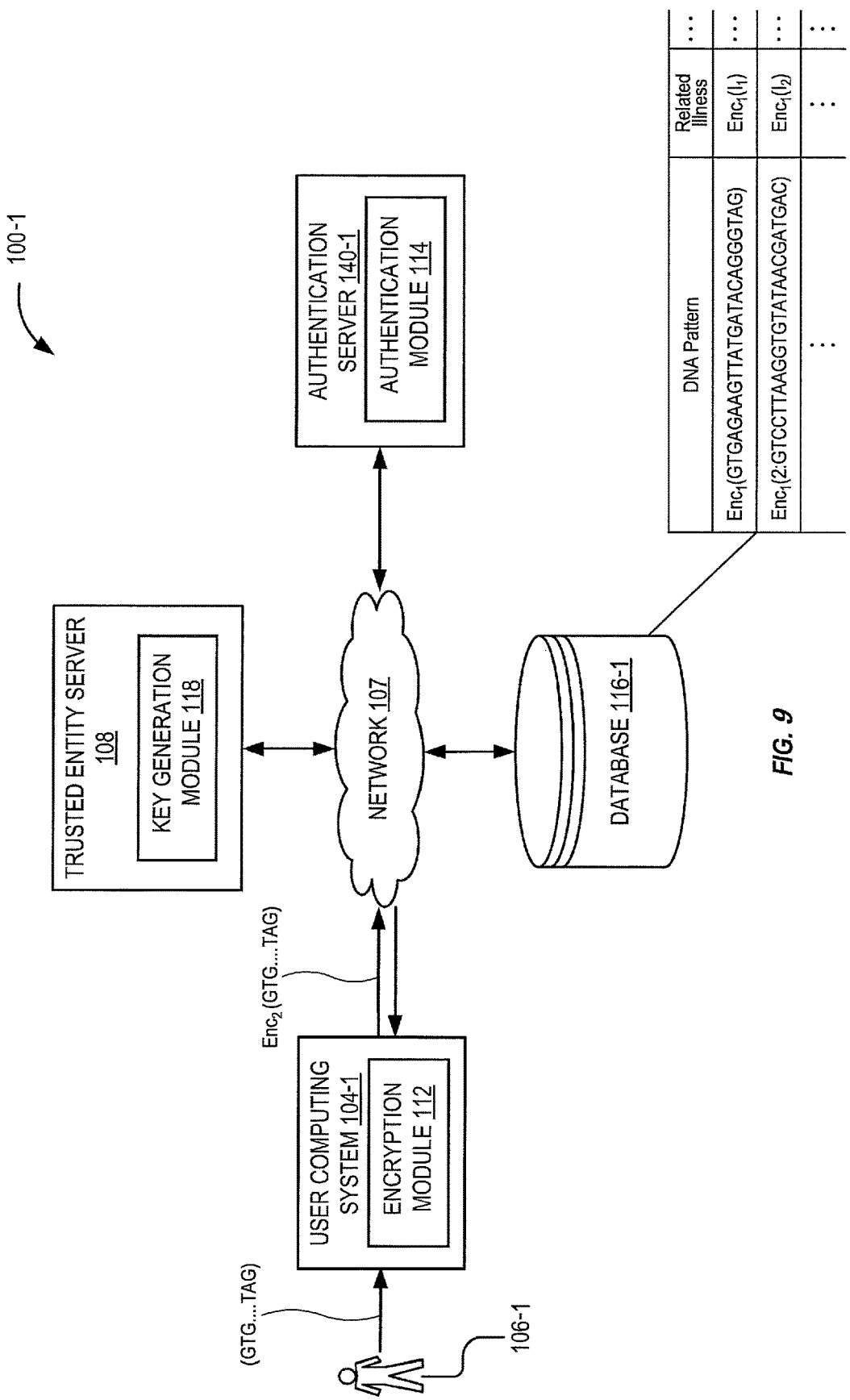
FIG. 9 is a diagram for explaining a third example of the method of equality verification using the relational encryption.

FIG. 9 is a diagram for explaining a third example of the method of equality verification using the relational encryption. In FIG. 9, those parts that are the same as those corresponding parts in FIG. 7 are designated by the same reference numerals, and a description thereof will be omitted.

In a case in which the information being searched is a DNA (deoxyribonucleic acid) pattern, which is one example of the medical and biometrical information, the user computing system 104-1 may be provided in a research facility, and the authentication server 140-1 and the database 116-1 may be provided in a hospital. As illustrated in FIG. 8, the database 116-1 may register genome data, such as a DNA pattern, an illness related to the DNA pattern, or the like, in encrypted form. Hence, a DNA pattern GTG . . . TAG and an illness $I_1$ related thereto are registered in encrypted form $Enc_1(GTG \ldots TAG)$ and $Enc_1(I_1)$, and a DNA pattern GTC . . . GAC and an illness $I_2$ related thereto are registered in encrypted form $Enc_1(GTC \ldots GAC)$ and $Enc_1(I_2)$, for example. The authentication server 140-1 may be operated by a user (or operator) to register the genome data in the database 116-1 in the encrypted form.

The user 106-1 of the user computing system 104-1 of the research facility may wish to know the illness related to the DNA pattern GTG . . . TAG, for example. In this case, the search for the DNA pattern GTG . . . TAG is made in encrypted form $Enc_2(GTG \ldots TAG)$, for example, and is not decrypted for the search and equality verification. The encryption $Enc_2$ used by the user computing system 104-1 for the search is different from the encryption $Enc_1$ used at the time of registering the genome data in the encrypted form in the database 116-1. In addition, the genome data in the encrypted form, registered in the database 116-1, is not decrypted for the equality verification. As a result, the user 106-1 of the user computing system 104-1 can find out whether the genome data related to the DNA pattern GTG . . . TAG is registered in the database, without leaving a search (or browser) log containing the DNA pattern GTG . . . TAG itself in the Web server or the like, and the content of the search can be concealed from a third party. Further, although the user 106-1 can find out that the genome data related to the DNA pattern GTG . . . TAG is registered in the database 116-1, the content related to the DNA pattern GTG . . . TAG, registered in the database 116-1 in the encrypted form, can be concealed from the user 106-1.

In a case in which the user 106-1 finds out that the DNA pattern GTG . . . TAG is registered in the database 116-1, the user 106-1 may contact an owner or manager of the database 116-1, that is, the hospital, and make necessary arrangements (for example, by way of a contract) to acquire at least a part of the genome data related to the DNA pattern GTG . . . TAG, that is, the illness $I_1$, registered in the database 116-1, when the owner or manager agrees to share the genome data with the user 106-1, for example. Accordingly, the owner of manager may agree to share, with the research facility, a part of the genome data related to the DNA pattern GTG . . . TAG, that is, the illness $I_1$ related to the DNA pattern GTG . . . TAG in this example. On the other hand, the owner of manager may not agree to share, with the research facility, another part of the genome data related to the DNA pattern GTG . . . TAG.

As a result, in this example, useful information can be shared and utilized efficiently between the research facility and the hospital agreeing to the information sharing with the research facility, while securing confidentiality of the genome data related to the DNA pattern GTG . . . TAG, registered in the database, from a third party. It is also possible to secure confidentiality of a part of the genome data related to the DNA pattern GTG . . . TAG, registered in the database, from the research facility to protect sensitive or secret information related to the DNA pattern GTG . . . TAG.

Figure 10:
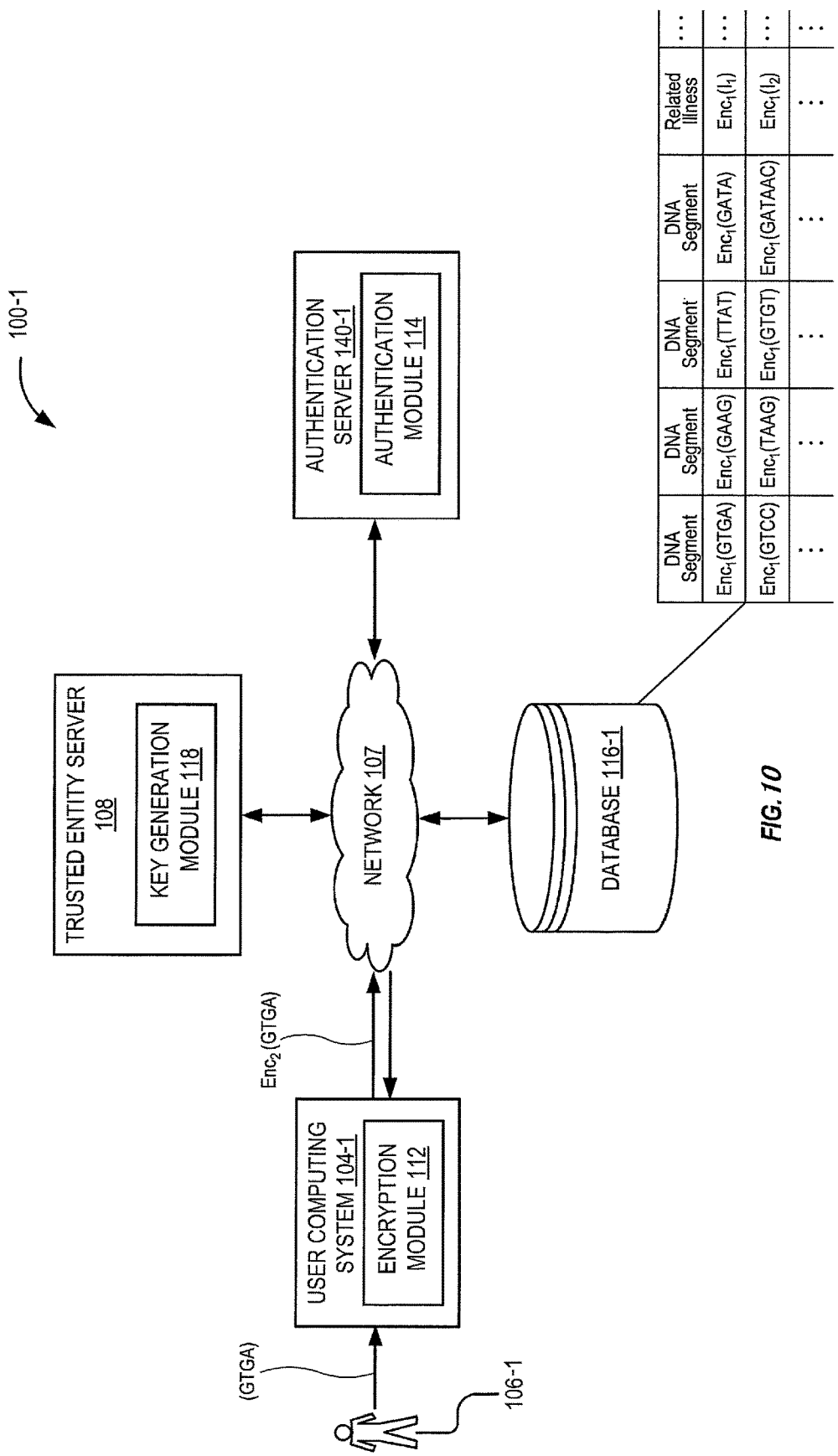
FIG. 10 is a diagram for explaining a fourth example of the method of equality verification using the relational encryption.

FIG. 10 is a diagram for explaining a fourth example of the method of equality verification using the relational encryption. In FIG. 10, those parts that are the same as those corresponding parts in FIG. 9 are designated by the same reference numerals, and a description thereof will be omitted.

As illustrated in FIG. 10, the database 116-1 may register the DNA pattern in segments (that is, segments of a single data), which are meaningful units related to an illness or the like, for example. In this example, DNA segments GTGA, GAAG, TTAT, GATA, . . . , an illness $I_1$ related thereto, or the like are registered in encrypted form $Enc_1(GTGA)$, $Enc_1(GAAG)$, $Enc_1(TTAT)$, $Enc_1(GATA)$, $Enc_1(I_1)$, or the like, for example. In addition, DNA segments GTCC, TAAG, GTGT, GATAAC, . . . , an illness $I_2$ related thereto, or the like are registered in encrypted form $Enc_1(GTCC)$, $Enc_1(TAAG)$, $Enc_1(GTGT)$, $Enc_1(GATAAC)$, $Enc_1(I_2)$, or the like, for example. In this case, the user 106-1 of the user computing system 104-1 of the research facility can find out whether information related to a DNA segment, such as the illness related to the DNA segment GTGA, for example, is registered in the database.

According to the second example described above, each of the first plaintext data set and the second plaintext data set includes a combination of a plurality of data items. On the other hand, according to the fourth example, each of the first plaintext data set and the second plaintext data set includes a plurality of segments of a single data item.

Figure 11:
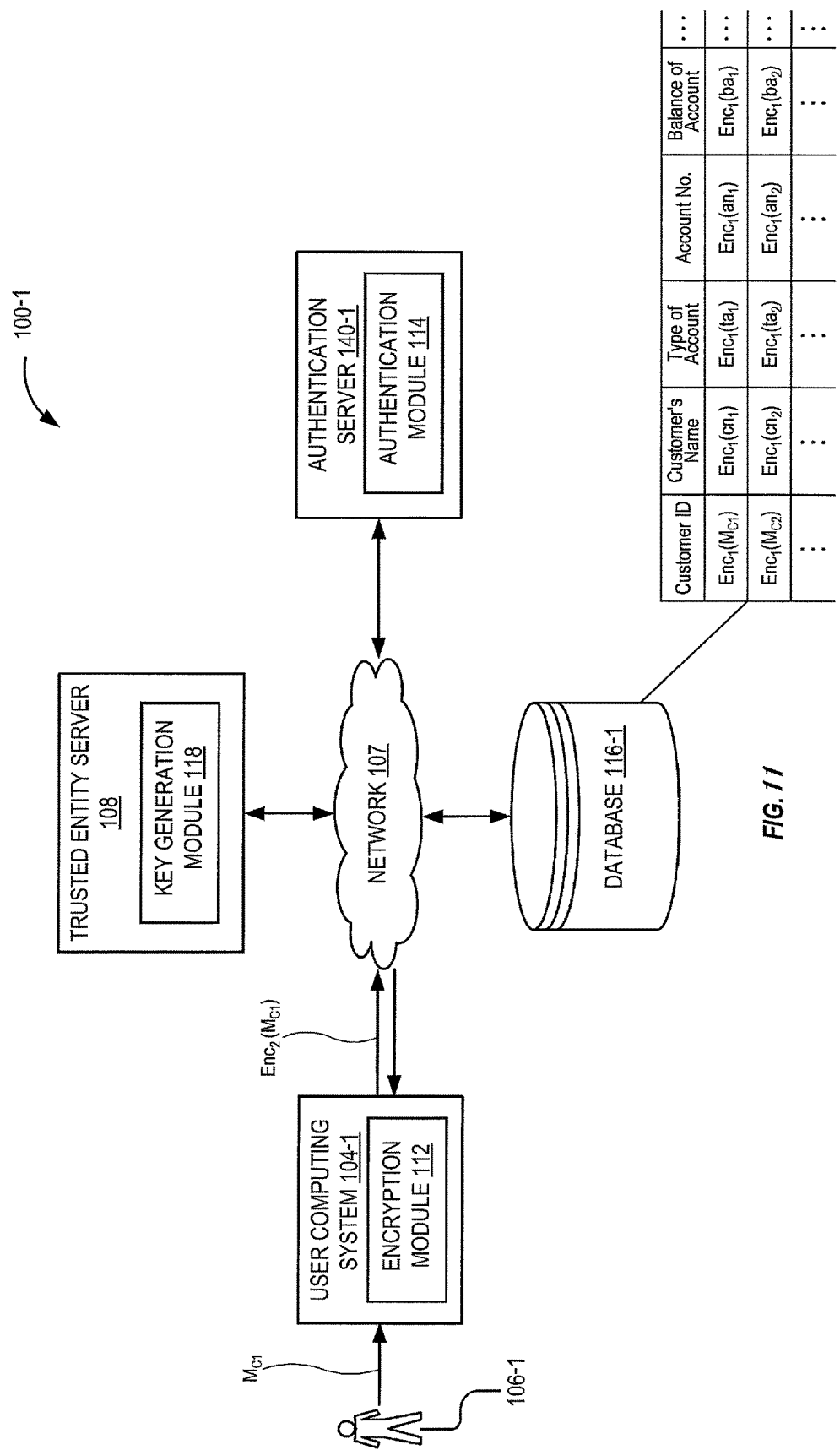
FIG. 11 is a diagram for explaining a fifth example of the method of equality verification using the relational encryption.

FIG. 11 is a diagram for explaining a fifth example of the method of equality verification using the relational encryption. In FIG. 11, those parts that are the same as those corresponding parts in FIG. 7 are designated by the same reference numerals, and a description thereof will be omitted.

The first through fourth examples described above perform the equality verification related to the medical and biometrical information. However, as described above, the information subjected to the equality verification is not limited to the medical and biometrical information. This fifth example performs the equality verification related to financial information, as one example of the kind of information to which the equality verification may be applied.

In a case in which the information being searched is a customer ID assigned to an individual, for example, the user computing system 104-1 may be provided in an administrative organization, and the authentication server 140-1 and the database 116-1 may be provided in a bank. As illustrated in FIG. 11, the database 116-1 may register data related to banking (hereinafter also referred to as "banking data"), such as a customer's name (cn), a type of account owned by the customer (ta), an account number (an), a balance of the customer's account (ba), or the like for each customer ID, in encrypted form. Hence, a customer ID $M_{C1}$ is registered in encrypted form $Enc_1(M_{C1})$, and a customer ID $M_{C2}$ is registered in encrypted form $Enc_1(M_{C2})$, for example. For example, the authentication server 140-1 may be operated by a user (or operator) to register the banking data in the database 116-1 in the encrypted form.

The user 106-1 of the user computing system 104-1 of the administrative organization may wish to know the type of account owned by the customer having the customer ID $M_{C1}$, for example. In this case, the search for the customer ID $M_{C1}$ is made in encrypted form $Enc_2(M_{C1})$, for example, and is not decrypted for the search and equality verification. The encryption $Enc_2$ used by the user computing system 104-1 for the search is different from the encryption $Enc_1$ used at the time of registering the banking data in the encrypted form in the database 116-1. In addition, the banking data in the encrypted form, registered in the database 116-1, is not decrypted for the equality verification. As a result, the user 106-1 of the user computing system 104-1 can find out whether the banking data related to the customer ID $M_{C1}$ is registered in the database, without leaving a search (or browser) log containing the customer ID $M_{C1}$ itself in the Web server or the like, and the content of the search can be concealed from a third party. Further, although the user 106-1 can find out that the banking data related to the customer ID $M_{C1}$ is registered in the database 116-1, the content related to the customer ID $M_{C1}$, registered in the database 116-1 in the encrypted form, can be concealed from the user 106-1.

In a case in which the user 106-1 finds out that the customer ID $M_{C1}$ is registered in the database 116-1, the user 106-1 may contact an owner or manager of the database 116-1, that is, the bank, and make necessary arrangements (for example, by way of a contract) to acquire at least a part of the content related to the customer ID $M_{C1}$, registered in the database 116-1, when the owner or manager agrees to share the content with the user 106-1, for example. Accordingly, the owner of manager may agree to share, with the administrative organization, a part of the banking data related to the customer ID $M_{C1}$, that is, the type of account owned by the customer having the customer ID $M_{C1}$. On the other hand, the owner of manager may not agree to share, with the administrative organization, another part of the banking data related to the customer ID $M_{C1}$, that is, the balance of the customer's account having the customer ID $M_{C1}$, for example.

As a result, in this example, useful information can be shared and utilized efficiently between the administrative organization and the bank agreeing to the information sharing with the administrative organization, while securing confidentiality of the banking data related to the customer ID $M_{C1}$, registered in the database, from a third party. It is also possible to secure confidentiality of a part of the banking data related to the customer ID $M_{C1}$, registered in the database, from the administrative organization to protect privacy information of the customer having the customer ID $M_{C1}$.

Figure 13:
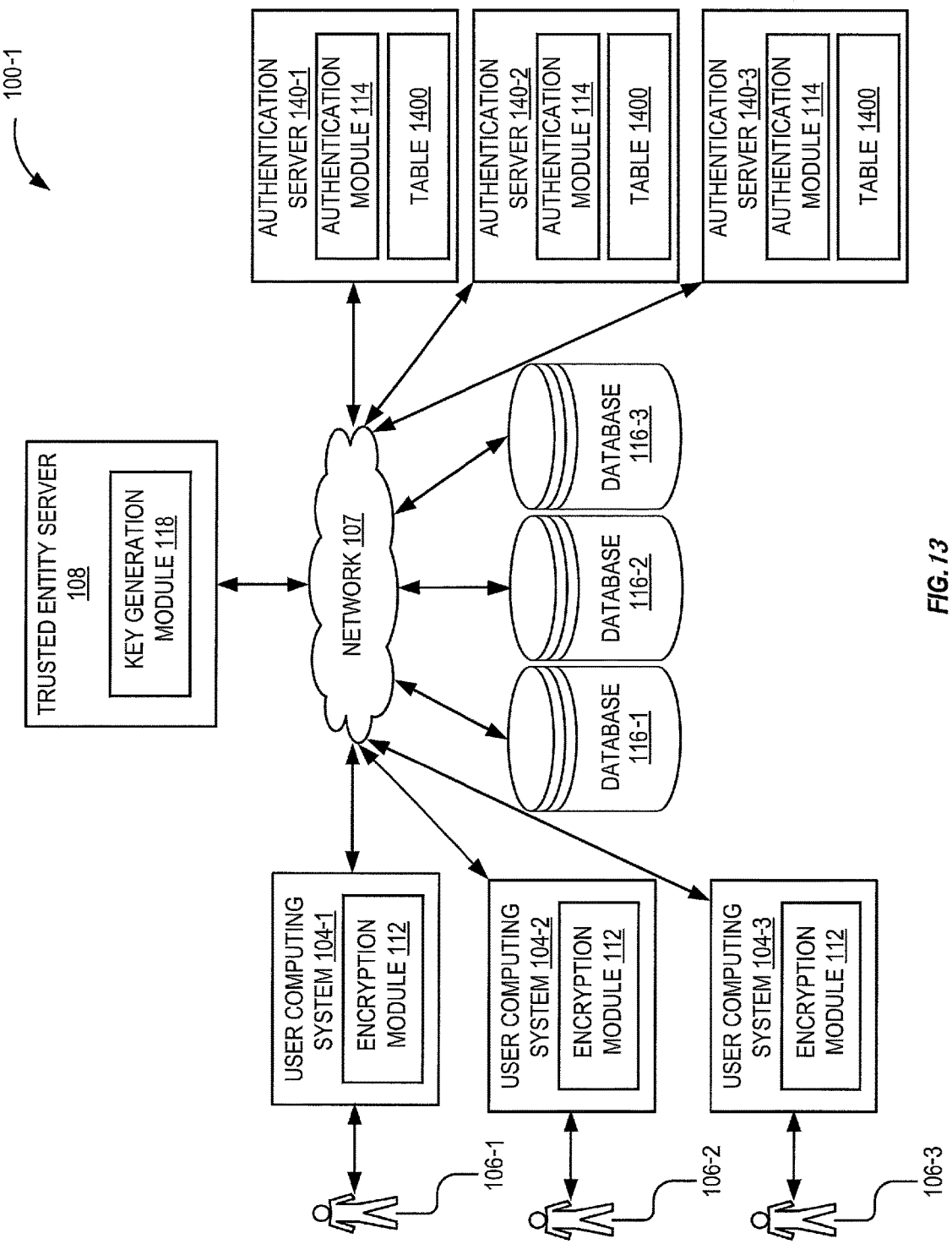
FIG. 13 is a diagram for explaining a sixth example of the method of equality verification using the relational encryption.

Next, a description will be given of a sixth example of the method of equality verification using the relational encryption, by referring to FIGS. 12 and 13. FIG. 12 illustrates an example of an access restricting table, and FIG. 13 is a diagram for explaining a sixth example of the method of equality verification using the relational encryption. In FIG. 13, those parts that are the same as those corresponding parts in FIG. 6 are designated by the same reference numerals, and a description thereof will be omitted. FIG. 13 illustrates a case in which L=M=N=3 in FIG. 6. In this example, each authentication server may restrict access to the database based on the access restricting table.

FIG. 12 illustrates the access restricting table 1400 for a case in which three user computing systems 104-1 through 104-3, three authentication servers 140-1 through 140-3, and three databases 116-1 through 116-3 are provided in the operating environment 100-1 illustrated in FIG. 13. In FIG. 12, Ka, Kb, and Kc denote verification keys communicated from the trusted entity server 108 at block 412 illustrated in FIG. 4, for example, to the user computing systems 104-1, 104-2, and 104-3, respectively. In addition, Kx, Ky, and Kz denote verification keys communicated from the trusted entity server 108 at block 412 illustrated in FIG. 4, for example, to the authentication servers 140-1, 140-2, and 140-3, respectively. In this example, the verification keys Ka, Kb, and Kc are assigned to users Ua, Ub, and Uc of the user computing systems 104-1, 104-2, and 104-3, respectively. In addition, the verification keys Kx, Ky, and Kz are assigned to users (or operators) Ux, Uy, and Uz of the authentication servers 140-1, 140-2, and 140-3, respectively. The access restricting table 1400 may be stored in each of the authentication servers 140-1, 140-2, and 140-3. Alternatively, the access restricting table 1400 may be communicated from the trusted entity server 108 at block 412 illustrated in FIG. 4, for example, to each of the authentication servers 140-1, 140-2, and 140-3.

The verification key of each user computing system may be communicated to the authentication server at block 420 or block 428 illustrated in FIG. 4, for example. The authentication server 140 at block 436 illustrated in FIG. 4 determines based on the access restricting table 1400 whether the authentication signal is to be invalidated, regardless of whether the authentication signal indicates that there is equality between the first and second plaintext data sets and/or whether the hash proof is verified.

In the access restricting table 1400, as an example, Ka-x indicates that the user computing system 104-1 having assigned the verification key Ka can access the equality verification result from the authentication server 140-1 having assigned the verification key Kx. Similarly, as an example, Ka-y indicates that the user computing system 104-1 having assigned the verification key Ka can access the equality verification result from the authentication server 140-2 having assigned the verification key Ky. Hence, in these cases, the user computing system 104-1 is permitted to access the equality verification result and receive, from the authentication servers 140-1 and 140-2, the authentication signal indicative of whether there is equality between the first and second plaintext data sets and/or whether the hash proof is verified.

On the other hand, in the access restricting table 1400, X at a combination of the verification keys Kb and Kz indicates that the user computing system 104-2 having assigned the verification key Kb is denied access to the equality verification result from the authentication server 140-3 having assigned the verification key Kz. In this case, the user computing system 104-2 is not permitted to receive the authentication signal from the authentication server 140-3, regardless of whether the authentication signal indicates that there is equality between the first and second plaintext data sets and/or whether the hash proof is verified.

Accordingly, the accessibility of the database of each authentication server from each user computing system can be controlled based on the access restricting table.

Figure 14:
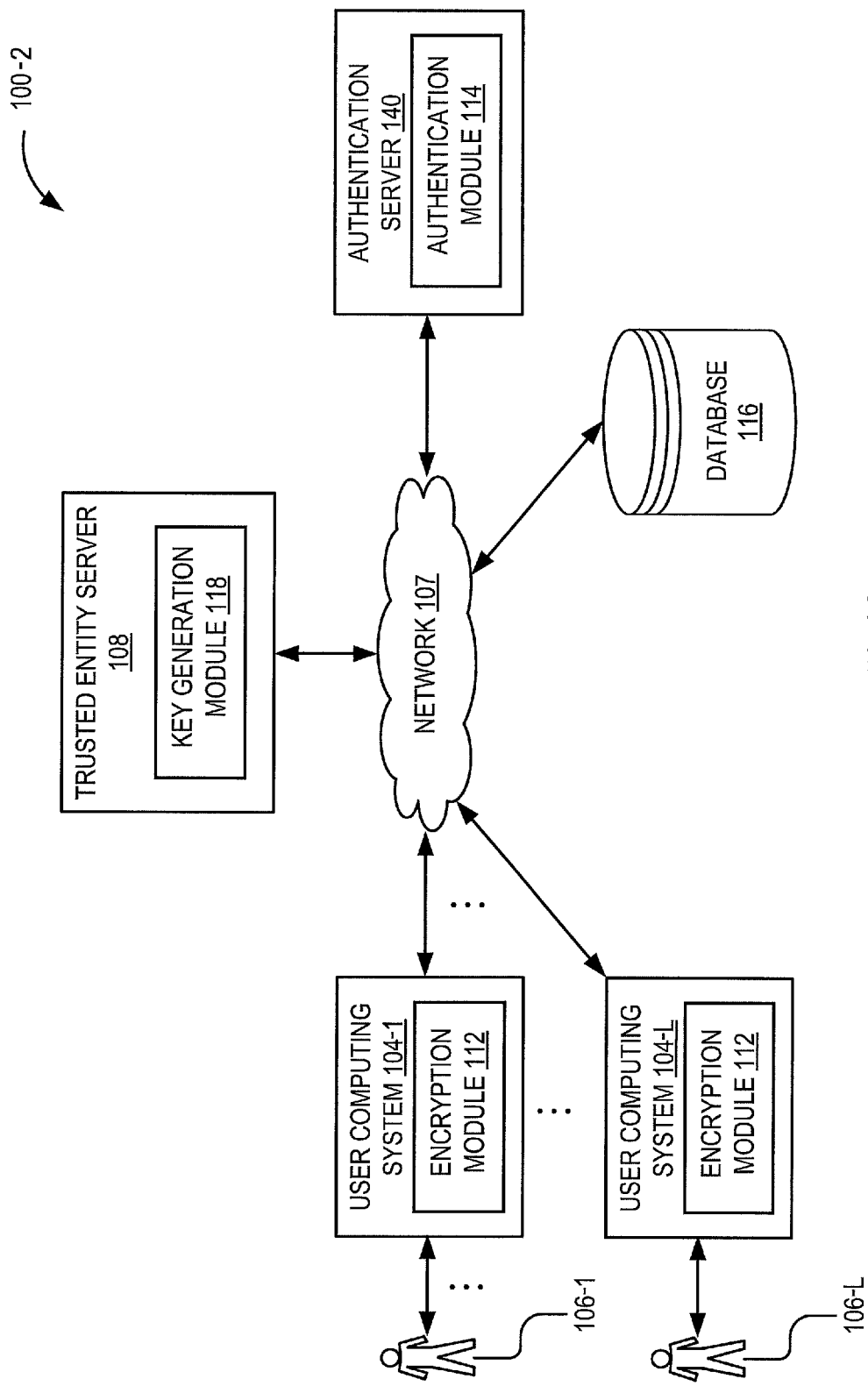
FIG. 14 is a block diagram of still another example operating environment.

FIG. 14 is a block diagram of still another example operating environment. In FIG. 14, those parts that are the same as those corresponding parts in FIG. 6 are designated by the same reference numerals, and a description thereof will be omitted. In an operating environment 100-2 illustrated in FIG. 14, the functions of the plurality of authentication servers 140-1, ..., and 140-M illustrated in FIG. 6 are integrated into a single authentication server 140 which may be operated by a user (or operator). In addition, the plurality of databases 116-1, ..., and 116-N are integrated into a single database 116.

Figure 15:
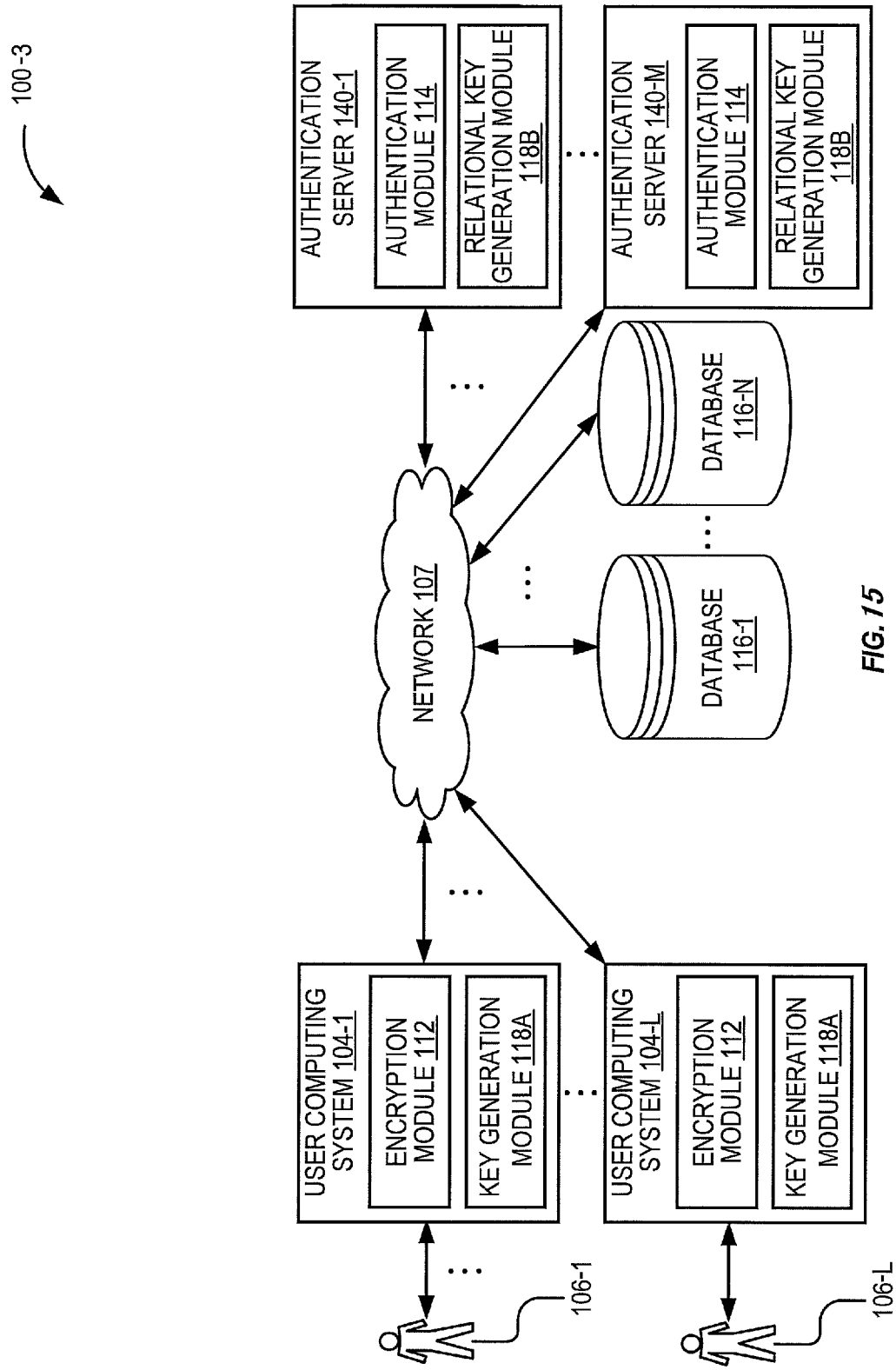
FIG. 15 is a block diagram of a further example operating environment, all arranged in accordance with at least one embodiment described herein.

FIG. 15 is a block diagram of a further example operating environment. In FIG. 15, those parts that are the same as those corresponding parts in FIG. 6 are designated by the same reference numerals, and a description thereof will be omitted. In an operating environment 100-3 illustrated in FIG. 15, the trusted entity server 108 illustrated in FIG. 6 is omitted. In addition, each of the user computing systems 104-1, ..., and 104-L is provided with a key generation module 118A which may be similar to the key generation module 118 of the trusted entity server 108. Further, each of the authentication servers 140-1, ..., and 140M is provided with a relational key generation module 118B to generate the relational key.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The description above use terms such as "determine", or the like to describe the embodiments, however, such terms are abstractions of the actual operations that are performed. Hence, the actual operations that correspond to such terms may vary depending on the implementation, as is obvious to those skilled in the art.

Although the examples are numbered with, for example, "first," "second," "third," "fourth," "fifth," or "sixth," the ordinal numbers do not imply priorities of the examples. Many other variations and modifications will be apparent to those skilled in the art.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of equality verification using relational encryption, the method comprising:
   receiving, from a trusted entity server, a relational key that includes a first relational key component;
   receiving, from a user computing system, a registration ciphertext that includes an encryption of a first plaintext data set;
   storing, in a non-transitory computer-readable storage medium, the registration ciphertext without decrypting the registration ciphertext;
   after the storing of the registration ciphertext, receiving, from the user computing system, an authentication request;
   in response to the authentication request, communicating a safeguard data set that includes a random challenge to the user computing system;
   receiving, from the user computing system, an encrypted response that is generated based at least partially on the safeguard data set and a second plaintext data set;
   verifying, by each of a plurality of authentication servers, a relationship between the encrypted response and the registration ciphertext using the relational key without decrypting the encrypted response and without decrypting the registration ciphertext, the relationship indicating that equality exists between the first plaintext data set and the second plaintext data set;
   communicating to the user computing system from one of the plurality of authentication servers an authentication signal indicative of whether there is equality between the first and second plaintext data sets in a case in which a combination of a first verification key assigned to the user computing system and a second verification key assigned to the one of the plurality of authentication servers permits access to a result of the verifying, and not communicating the authenticating signal to the user computing system in a case in which the combination of the first and second verification keys denies access to the result of the verifying, regardless of whether the authentication signal indicates that there is equality between the first and second plaintext data sets; and
   receiving, from the trusted entity server, a public key set that includes a first public key, a second public key, a public hash key of a hash function, and the hash function,
   wherein:
      the relational key further includes a secret hash key of the hash function, and
      the encrypted response is further based on one or more public hash key elements of the public hash key and a random test sample data set.

2. The method as claimed in claim 1, further comprising:
   receiving, from the trusted entity server, the first verification key by the user computing system; and
   receiving, from the trusted entity server, the second verification key.

3. The method as claimed in claim 1, wherein each of the first plaintext data set and the second plaintext data set includes a combination of a plurality of data items, or a plurality of segments of a single data item.

4. The method as claimed in claim 1, wherein each of the first plaintext data set and the second plaintext data set is one of medical and biological information, technical information, and financial information.

5. The method as claimed in claim 4, wherein the medical and biological information includes one of clinical data, health data, and genome data.

6. A non-transitory computer-readable medium having encoded therein programming code executable by one or a plurality of processors to perform or control performance of operations comprising:
   receiving, from a trusted entity server, a relational key that includes a first relational key component;
   receiving, from a user computing system, a registration ciphertext that includes an encryption of a first plaintext data set;
   storing, in a non-transitory computer-readable storage media, the registration ciphertext without decrypting the registration ciphertext;
   after the storing of the registration ciphertext, receiving, from the user computing system, an authentication request;
   in response to the authentication request, communicating a safeguard data set that includes a random challenge to the user computing system;
   receiving, from the user computing system, an encrypted response that is generated based at least partially on the safeguard data set and a second plaintext data set;
   verifying a relationship between the encrypted response and the registration ciphertext using the relational key without decrypting the encrypted response and without decrypting the registration ciphertext, the relationship indicating that equality exists between the first plaintext data set and the second plaintext data set;
   communicating to the user computing system an authentication signal indicative of whether there is equality between the first and second plaintext data sets in a case in which a combination of a first verification key assigned to the user computing system and a second verification key assigned to one of the plurality of processors permits access to a result of the verifying, and not communicating the authenticating signal to the user computing system in a case in which the combination of the first and second verification keys denies access to the result of the verifying, regardless of whether the authentication signal indicates that there is equality between the first and second plaintext data sets; and
   receiving, from the trusted entity server, a public key set that includes a first public key, a second public key, a public hash key of a hash function, and the hash function,
   wherein:
      the relational key further includes a secret hash key of the hash function, and
      the encrypted response is further based on one or more public hash key elements of the public hash key and a random test sample data set.

7. The non-transitory computer-readable medium as claimed in claim 6, wherein the operations further comprise:
   receiving the first and second verification keys from the trusted entity server.

8. The non-transitory computer-readable medium as claimed in claim 6, wherein each of the first plaintext data set and the second plaintext data set includes a combination of a plurality of data items, or a plurality of segments of a single data item.

9. The non-transitory computer-readable medium as claimed in claim 6, wherein each of the first plaintext data set and the second plaintext data set is one of medical and biological information, technical information, and financial information.

10. The non-transitory computer-readable medium as claimed in claim 9, wherein the medical and biological information includes one of clinical data, health data, and genome data.

11. A method of equality verification of medical and biological information using relational encryption, the method comprising:
  receiving, from a trusted entity server, a relational key that includes a first relational key component;
  receiving, from a user computing system, a registration ciphertext that includes an encryption of a first plaintext data set related to medical and biological information;
  storing, in a non-transitory computer-readable storage medium, the registration ciphertext without decrypting the registration ciphertext;
  after the storing of the registration ciphertext, receiving, from the user computing system, an authentication request;
  in response to the authentication request, communicating a safeguard data set that includes a random challenge to the user computing system;
  receiving, from the user computing system, an encrypted response that is generated based at least partially on the safeguard data set and a second plaintext data set related to medical and biological information;
  verifying, by each of a plurality of processors, a relationship between the encrypted response and the registration ciphertext using the relational key without decrypting the encrypted response and without decrypting the registration ciphertext, the relationship indicating that equality exists between the first plaintext data set and the second plaintext data set;
  communicating to the user computing system from one of the plurality of processors an authentication signal indicative of whether there is equality between the first and second plaintext data sets in a case in which a combination of a first verification key assigned to the user computing system and a second verification key assigned to the one of the plurality of processors permits access to a result of the verifying, and not communicating the authenticating signal to the user computing system in a case in which the combination of the first and second verification keys denies access to the result of the verifying, regardless of whether the authentication signal indicates that there is equality between the first and second plaintext data sets; and
  receiving, from the trusted entity server, a public key set that includes a first public key, a second public key, a public hash key of a hash function, and the hash function,
  wherein:
    the relational key further includes a secret hash key of the hash function, and
    the encrypted response is further based on one or more public hash key elements of the public hash key and a random test sample data set.

12. The method of claim 11, wherein the medical and biological information includes at least one of clinical data, health data, and genome data.

13. A non-transitory computer-readable medium having encoded therein programming code executable by one or a plurality of processors to perform or control performance of operations comprising:
  receiving, from a trusted entity server, a relational key that includes a first relational key component;
  receiving, from a user computing system, a registration ciphertext that includes an encryption of a first plaintext data set related to medical and biological information;
  storing, in a non-transitory computer-readable storage media, the registration ciphertext without decrypting the registration ciphertext;
  after the storing of the registration ciphertext, receiving, from the user computing system, an authentication request;
  in response to the authentication request, communicating a safeguard data set that includes a random challenge to the user computing system;
  receiving, from the user computing system, an encrypted response that is generated based at least partially on the safeguard data set and a second plaintext data set related to medical and biological information;
  verifying a relationship between the encrypted response and the registration ciphertext using the relational key without decrypting the encrypted response and without decrypting the registration ciphertext, the relationship indicating that equality exists between the first plaintext data set and the second plaintext data set;
  communicating to the user computing system an authentication signal indicative of whether there is equality between the first and second plaintext data sets in a case in which a combination of a first verification key assigned to the user computing system and a second verification key assigned to one of the plurality of processors permits access to a result of the verifying, and not communicating the authenticating signal to the user computing system in a case in which the combination of the first and second verification keys denies access to the result of the verifying, regardless of whether the authentication signal indicates that there is equality between the first and second plaintext data sets; and
  receiving, from the trusted entity server, a public key set that includes a first public key, a second public key, a public hash key of a hash function, and the hash function,
  wherein:
    the relational key further includes a secret hash key of the hash function, and
    the encrypted response is further based on one or more public hash key elements of the public hash key and a random test sample data set.

14. The non-transitory computer-readable medium of claim 13, wherein the medical and biological information includes at least one of clinical data, health data, and genome data.

* * * * *